US009222381B2

(12) United States Patent
Saitou et al.

(10) Patent No.: US 9,222,381 B2
(45) Date of Patent: Dec. 29, 2015

(54) ENGINE DEVICE

(71) Applicant: YANMAR CO., LTD., Osaka (JP)

(72) Inventors: Kenta Saitou, Osaka (JP); Masayuki Yamada, Osaka (JP); Masataka Mitsuda, Osaka (JP); Shigehito Yoshimura, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 14/372,627

(22) PCT Filed: Jan. 18, 2013

(86) PCT No.: PCT/JP2013/050949
§ 371 (c)(1),
(2) Date: Jul. 16, 2014

(87) PCT Pub. No.: WO2013/108879
PCT Pub. Date: Jul. 25, 2013

(65) Prior Publication Data
US 2014/0360172 A1 Dec. 11, 2014

(30) Foreign Application Priority Data

Jan. 19, 2012 (JP) .................................. 2012-008948
Jan. 16, 2013 (JP) .................................. 2013-005654

(51) Int. Cl.
*F01N 3/02* (2006.01)
*F02D 9/04* (2006.01)
(Continued)

(52) U.S. Cl.
CPC .. *F01N 3/02* (2013.01); *F01N 3/20* (2013.01); *F01N 13/00* (2013.01); *F01N 13/102* (2013.01); *F01N 13/14* (2013.01); *F02D 9/04* (2013.01); *F02F 7/0068* (2013.01); *F01N 3/0231* (2013.01);
(Continued)

(58) Field of Classification Search
CPC ............ F02F 7/0068; F01N 3/02; F01N 3/20; F01N 13/102; F01N 13/00; F01N 13/14; F01N 2560/14; F01N 2260/024; F02D 9/04; F02M 25/0734; F01P 11/04
USPC .......................................................... 60/320
See application file for complete search history.

(56) References Cited

U.S. PATENT DOCUMENTS

2009/0094978 A1* 4/2009 Yamagata et al. .... F01N 13/107
60/602
2010/0206265 A1* 8/2010 Yamagata et al. ...... F01N 13/10
123/337

FOREIGN PATENT DOCUMENTS

JP 49-50318 5/1974
JP 3-023306 1/1991
(Continued)

*Primary Examiner* — Jason Shanske
(74) *Attorney, Agent, or Firm* — Jordan and Hamburg LLP

(57) ABSTRACT

An engine device in which a support structure of an exhaust throttle device can be made as a high rigidity structure, and it is possible to prevent the exhaust throttle device from being heated by radiation heat from peripheries of the exhaust throttle device. The engine device of the invention includes an engine having an exhaust manifold, and the exhaust throttle device adjusts exhaust gas pressure of the exhaust manifold An exhaust gas intake side of a throttle valve case of the exhaust throttle device is fastened to an exhaust gas outlet of the exhaust manifold, and an exhaust gas pipe is connected to the exhaust manifold through the throttle valve case. An intermediate portion of a cooling pipe of an EGR cooler is provided with a cooling water pipe of the exhaust throttle device.

10 Claims, 21 Drawing Sheets

(51) Int. Cl.
  F02F 7/00  (2006.01)
  F01N 3/20  (2006.01)
  F01N 13/10  (2010.01)
  F01N 13/00  (2010.01)
  F01N 13/14  (2010.01)
  F02M 25/07  (2006.01)
  F01P 11/04  (2006.01)
  F01N 3/10  (2006.01)
  F01N 3/023  (2006.01)

(52) U.S. Cl.
  CPC ............... *F01N 3/106* (2013.01); *F01N 13/10* (2013.01); *F01N 2240/36* (2013.01); *F01N 2260/024* (2013.01); *F01N 2260/14* (2013.01); *F01N 2340/02* (2013.01); *F01N 2560/06* (2013.01); *F01N 2560/08* (2013.01); *F01N 2560/14* (2013.01); *F01P 11/04* (2013.01); *F02M 25/0734* (2013.01)

(56) References Cited

FOREIGN PATENT DOCUMENTS

| | | | | |
|---|---|---|---|---|
| JP | 2009-097335 | | | 5/2009 |
| JP | 2009-209878 | | | 9/2009 |
| JP | 2009209878 | A | * | 9/2009 |
| JP | 2010-185292 | | | 8/2010 |
| JP | 2010-185340 | | | 8/2010 |
| JP | 2010-185403 | | | 8/2010 |
| JP | 2010185403 | A | * | 8/2010 |

* cited by examiner

ENGINE DEVICE

TECHNICAL FIELD

The present invention of this application relates to an engine device such as a diesel engine provided in a utility vehicle like a skid-steer loader, a backhoe and a forklift car, an agricultural machine like a tractor and a combine-harvester, and a stationary electric generator or a refrigerator, and more particularly, to an engine device provided with an exhaust throttle device which adjusts pressure of exhaust gas discharged from an exhaust manifold.

BACKGROUND OF THE INVENTION

Conventionally, there is developed a technique in which an exhaust gas purification device (diesel particulate filter) is provided in an exhaust path of an engine and exhaust gas discharged from a diesel engine is purified by an oxidation catalyst or a soot filter of the exhaust gas purification device (see Patent Document 1, for example).

Conventionally, an exhaust throttle device is provided in an exhaust path of an engine to prevent temperature of exhaust gas discharged into an exhaust gas purification device from being lowered, and purification performance of the exhaust gas purification device is maintained.

CITATION LIST

Patent Literature

Patent Document 1: Japanese Unexamined Patent Application Publication. No. 2010-185340

SUMMARY OF THE INVENTION

Even if the exhaust gas purification device is assembled such that it is separated from the engine as in patent document 1, it is possible to maintain the temperature of exhaust gas supplied from the engine to the exhaust gas purification device to prevent regeneration of a soot filter of the exhaust gas purification device from becoming incomplete. According to a structure in which a throttle valve case is connected to an exhaust manifold through a relay pipe, however, there is a problem that a capacity of an exhaust gas intake side of the exhaust throttle device cannot easily be reduced, and an extending direction of an exhaust pipe which connects an exhaust throttle device to the exhaust gas purification device is specified.

The exhaust throttle device includes an electric part such as an actuator for operating a throttle valve, and this electric part is easily affected by heat. Since temperature of exhaust gas which passes through the exhaust manifold is extremely high, there is a problem that the exhaust throttle device receives influence of radiation heat of the exhaust manifold and abnormal operation of the exhaust throttle device occurs.

These circumstances are examined, and the present invention of this application provides an improved engine device.

A first aspect of the invention provides an engine device including an engine including an exhaust manifold, in which an exhaust throttle device adjusts exhaust gas pressure of the exhaust manifold, an exhaust as intake side of a throttle valve case of the exhaust throttle device is fastened to an exhaust gas outlet of the exhaust manifold, and an exhaust gas pipe is connected to the exhaust manifold through the throttle valve case.

According to a second aspect of the invention, in the engine device of the first aspect, the throttle valve case is fastened to an upper surface of the exhaust manifold, a relay pipe is fastened to an upper surface of the throttle valve case, the throttle valve case and the relay pipe are placed in a multi-layered form with respect to the exhaust manifold, and the exhaust gas pipe is connected to the relay pipe of an uppermost layer.

According to a third aspect of the invention, in the engine device of the first aspect, an exhaust gas outlet of the exhaust manifold opens upwardly, the upper surface of the exhaust manifold is provided with the throttle valve case, a throttle valve gas outlet is formed in the upper surface of the throttle valve case, and an EGR cooler for cooling EGR gas is placed below the throttle valve case such that EGR cooler and the throttle valve case sandwich the exhaust manifold.

According to a fourth aspect of the invention, in the engine device of the first aspect, an intermediate portion of an engine cooling water pipe is provided with a cooling water pipe of the exhaust throttle device.

According to a fifth aspect of the invention, in the engine device of the first aspect, a heat shield member for blocking heat from the exhaust manifold is provided between the exhaust manifold and the exhaust throttle device.

According to a sixth aspect of the invention, in the engine device of the fifth aspect, the heat shield member includes a heat shield plate provided between the exhaust manifold and the exhaust throttle device, and a plate material which stands from an end side of the heat shield plate closer to the engine and which is connected to an upper portion of the exhaust throttle device.

According to a seventh aspect of the invention, in the engine device of the fifth aspect, the heat shield member includes a heat shield plate provided between the exhaust manifold and the exhaust throttle device, and two plate materials which stand from both end sides of the heat shield plate and which are connected to an upper portion of the exhaust throttle device, and the heat shield member is hanged from and supported by the exhaust throttle device.

According to an eighth aspect of the invention, in the engine device of the fifth aspect, the engine device further includes a cooling water pump for circulating cooling water, and an EGR cooler for cooling EGR gas, a cooling water pipe path connects the cooling water pump and the EGR cooler to each other, and an intermediate portion of the cooling water pipe path is provided with a cooling water pipe of the exhaust throttle device.

According to the first aspect of the invention, the engine device includes an engine including an exhaust manifold, in which an exhaust throttle device adjusts exhaust gas pressure of the exhaust manifold, an exhaust gas intake side of a throttle valve case of the exhaust throttle device is fastened to an exhaust gas outlet of the exhaust manifold, and an exhaust gas pipe is connected to the exhaust manifold through the throttle valve case. Therefore, the exhaust throttle device can be supported by the high rigidity exhaust manifold, and the support structure of the exhaust throttle device can be made as a high rigidity structure. As compared with a structure in which the throttle valve case is connected to the exhaust manifold through a relay pipe for example, it is possible to reduce a capacity of an exhaust gas intake side of the exhaust throttle device, and to precisely adjust exhaust gas pressure in the exhaust manifold. For example, temperature of exhaust gas supplied to the exhaust gas purification device and the like can easily be maintained at temperature suitable for purification of exhaust gas.

According to the second aspect of the invention, the throttle valve case is fastened to an upper surface of the exhaust manifold, a relay pipe is fastened to an upper surface of the throttle valve case, the throttle valve case and the relay pipe are placed in a multi-layered form with respect to the exhaust manifold, and the exhaust gas pipe is connected to the relay pipe of an uppermost layer. Therefore, it is possible to change a mounting attitude (connecting direction of exhaust pipe) of the relay pipe in accordance with a mounting position of the exhaust gas purification device without changing a support attitude of the exhaust throttle device or without changing specifications of the relay pipe.

According to the third aspect of the invention, an exhaust gas outlet of the exhaust manifold opens upwardly, the upper surface of the exhaust manifold is provided with the throttle valve case, a throttle valve gas outlet is formed in the upper surface of the throttle valve case, and an EGR cooler for cooling EGR gas is placed below the throttle valve case such that EGR cooler and the throttle valve case sandwich the exhaust manifold. Therefore, the exhaust manifold, the exhaust throttle device and the EGR cooler can compactly be placed along one side surface of the engine, and the exhaust pipe can be extended laterally or upwardly from the throttle valve gas outlet of the throttle valve case in accordance with placement of the exhaust gas purification device for example. A cooling water pipe connected to the exhaust throttle device and the EGR cooler can compactly be supported while utilizing an outer surface of the exhaust manifold.

According to the fourth aspect of the invention, the engine device includes an engine including an exhaust manifold, in which an exhaust throttle device adjusts exhaust gas pressure of the exhaust manifold, an exhaust gas intake side of a throttle valve case of the exhaust throttle device is fastened to an exhaust gas outlet of the exhaust manifold, an exhaust gas pipe is connected to the exhaust manifold through the throttle valve case, and an intermediate portion of the engine cooling water pipe is provided with the cooling water pipe of the exhaust throttle device. Therefore, the exhaust manifold and the exhaust throttle device can compactly be placed along one side surface of the engine, and the cooling water pipe connected to the exhaust throttle device can compactly be supported. It is possible to reduce a capacity of the exhaust gas intake side of the exhaust throttle device, and to precisely adjust exhaust gas pressure in the exhaust manifold. Hence, temperature of exhaust gas supplied to the exhaust gas purification device can easily be maintained at temperature suitable for purification of exhaust gas for example. Temperature of exhaust gas supplied to the exhaust gas purification device and the like can easily be maintained at temperature suitable for purification of exhaust gas while utilizing an outer surface of the exhaust manifold.

According to the fifth aspect of the invention, a heat shield member for blocking heat from the exhaust manifold is provided between the exhaust manifold and the exhaust throttle device. Therefore, it is possible to block radiation heat from the exhaust manifold through which extremely high temperature exhaust gas flows. Hence, in the exhaust throttle device, it is possible to prevent the engine device from being heated by the radiation heat from the exhaust manifold, and to maintain a cooling effect achieved by cooling water.

According to the sixth aspect of the invention, the heat shield member includes a heat shield plate provided between the exhaust manifold and the exhaust throttle device, and a plate material which stands from an end side of the heat shield plate closer to the engine and which is connected to an upper portion of the exhaust throttle device. Therefore, it is possible to block radiation heat from the engine. Hence, in the exhaust throttle device, it is possible to prevent the engine device from being heated by the radiation heat from the engine, and to maintain a cooling effect achieved by cooling water.

According to the seventh aspect of the invention, the heat shield member includes a heat shield plate provided between the exhaust manifold and the exhaust throttle device, and two plate materials which stand from both end sides of the heat shield plate and which are connected to an upper portion of the exhaust throttle device, and the heat shield member is hanged from and supported by the exhaust throttle device. Therefore, a relative position between the heat shield member and the exhaust throttle device can be fixed. Accordingly, a space is formed between the heat shield member and the exhaust throttle device, and it is possible to prevent a cooling effect achieved by cooling water in the exhaust throttle device from being deteriorated by the heat insulating effect.

According to the eighth aspect of the invention, the engine device further includes a cooling water pump for circulating cooling water, and an EGR cooler for cooling EGR gas, a cooling water pipe path connects the cooling water pump and the EGR cooler to each other, and an intermediate portion of the cooling water pipe path is provided with a cooling water pipe of the exhaust throttle device. Therefore, the exhaust manifold, the exhaust throttle device and the EGR cooler can compactly be placed along one side surface of the engine, and the exhaust pipe can be extended laterally or upwardly from the throttle valve gas outlet of the throttle valve case in accordance with placement of the exhaust gas purification device for example. The cooling water pipe connected to the exhaust throttle device and the EGR cooler can compactly be supported while utilizing an outer surface of the exhaust manifold.

DESCRIPTION OF THE PREFERRED EMBODIMENTS

Figure 1:
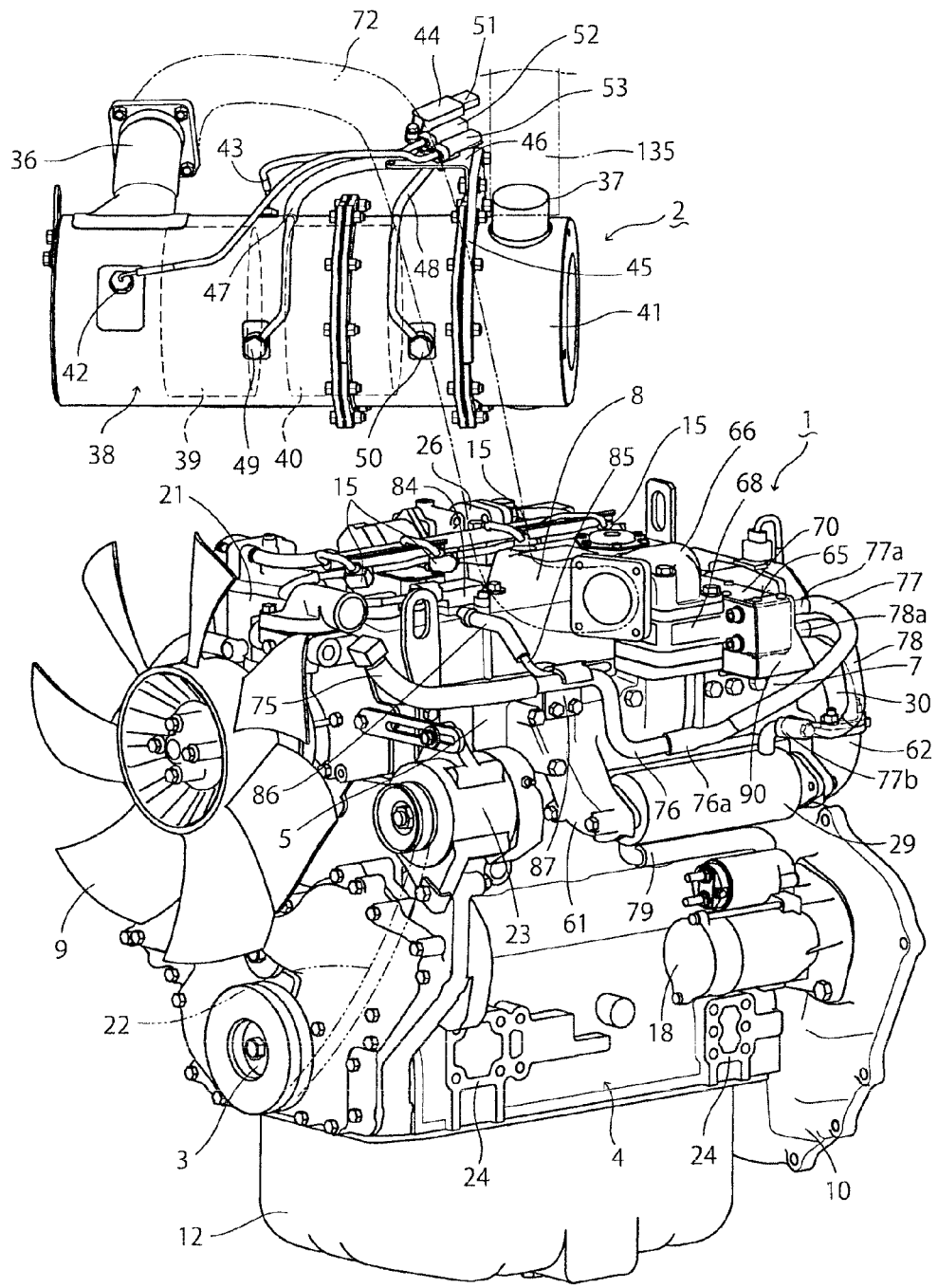
FIG. 1 is a perspective view of a diesel engine showing a first embodiment.
Figure 2:
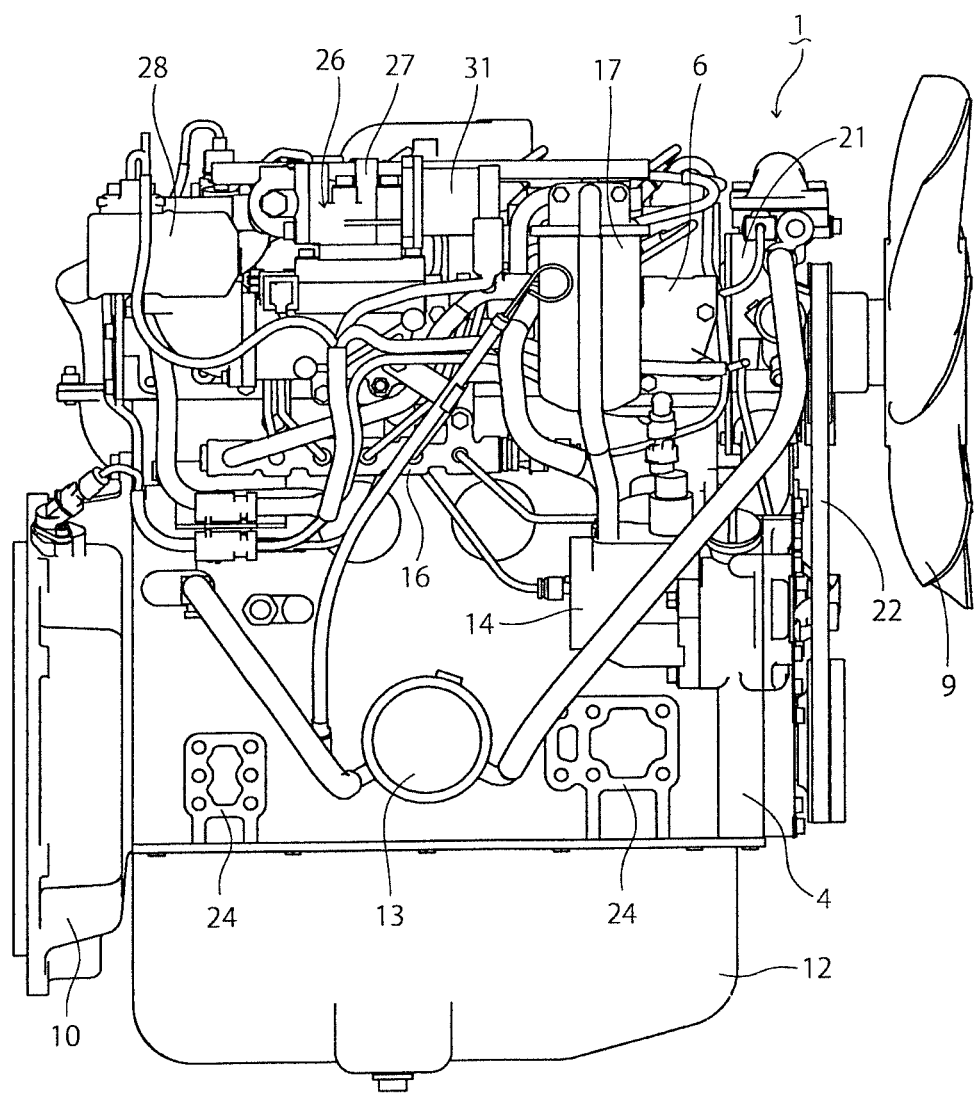
FIG. 2 is a front view of the diesel engine.
Figure 3:
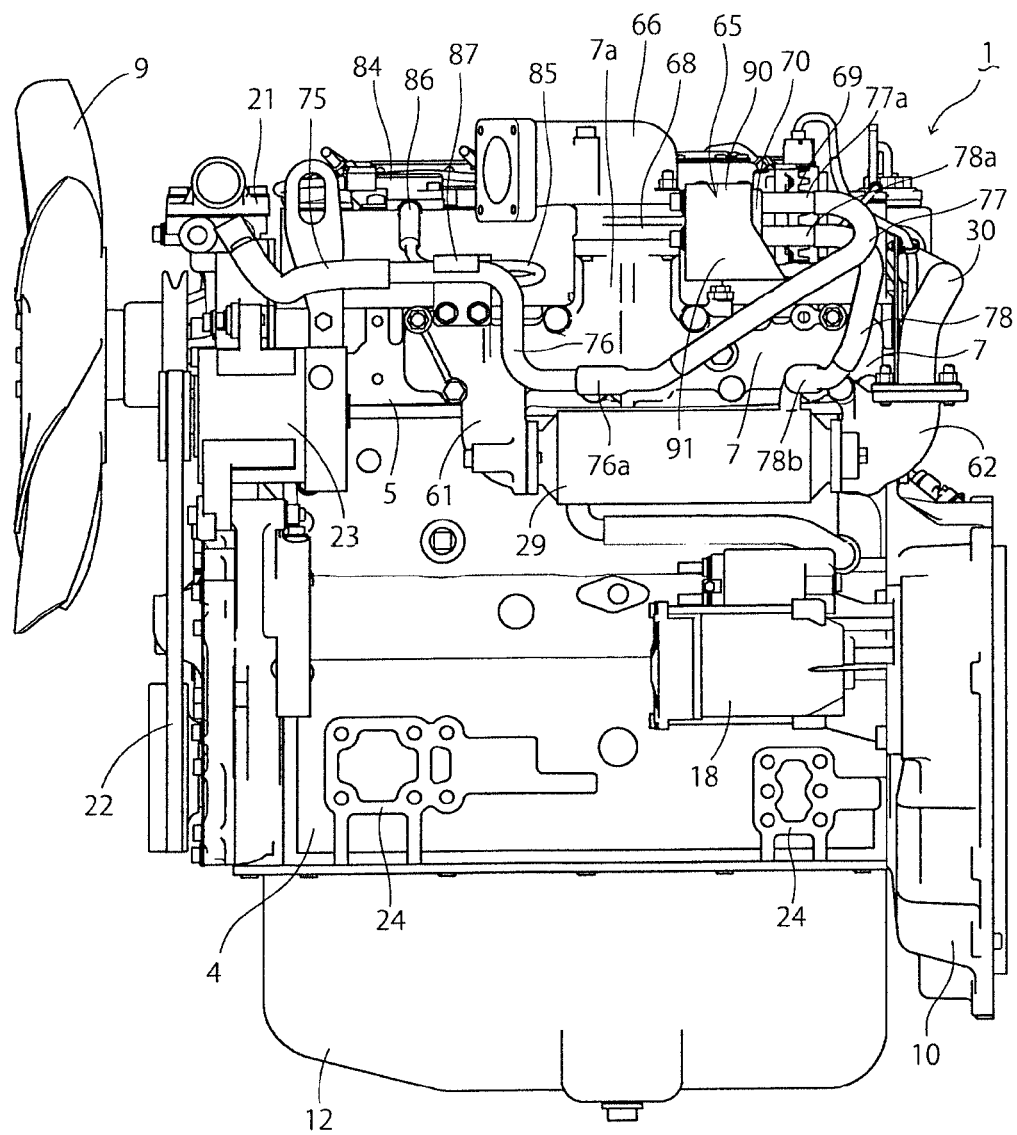
FIG. 3 is a rear view of the diesel engine.
Figure 4:
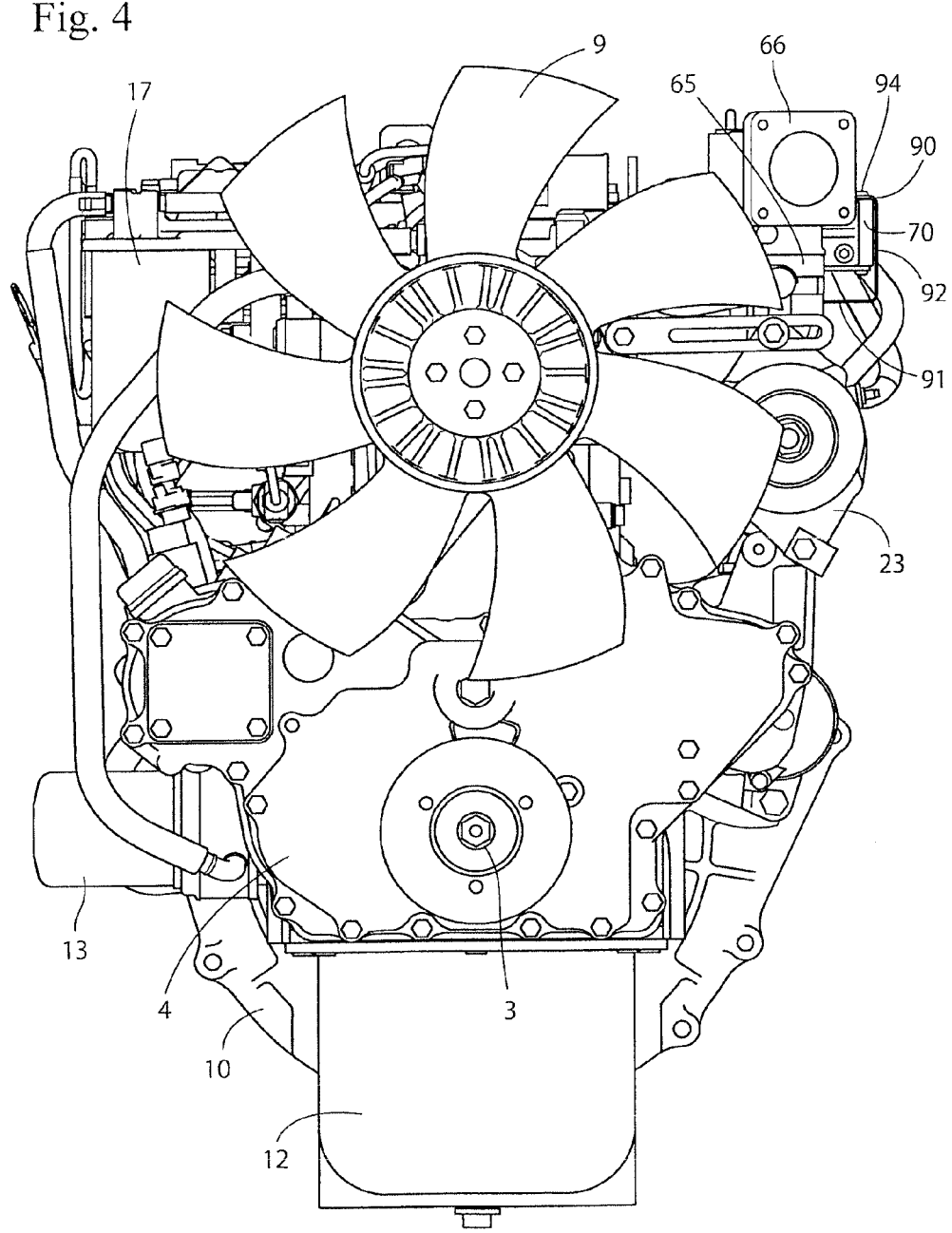
FIG. 4 is a right side view of the diesel engine.
Figure 5:
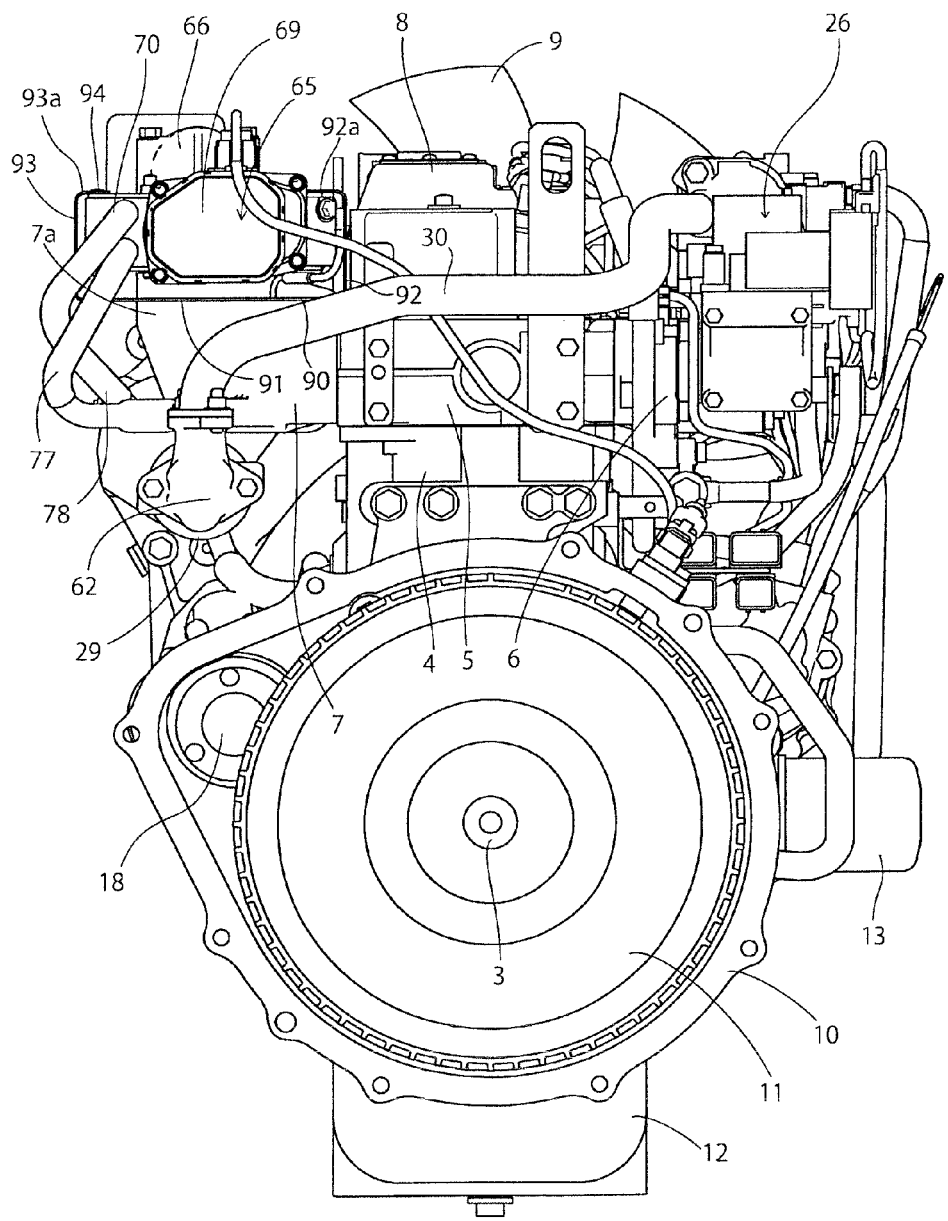
FIG. 5 is a left side view of the diesel engine.
Figure 6:
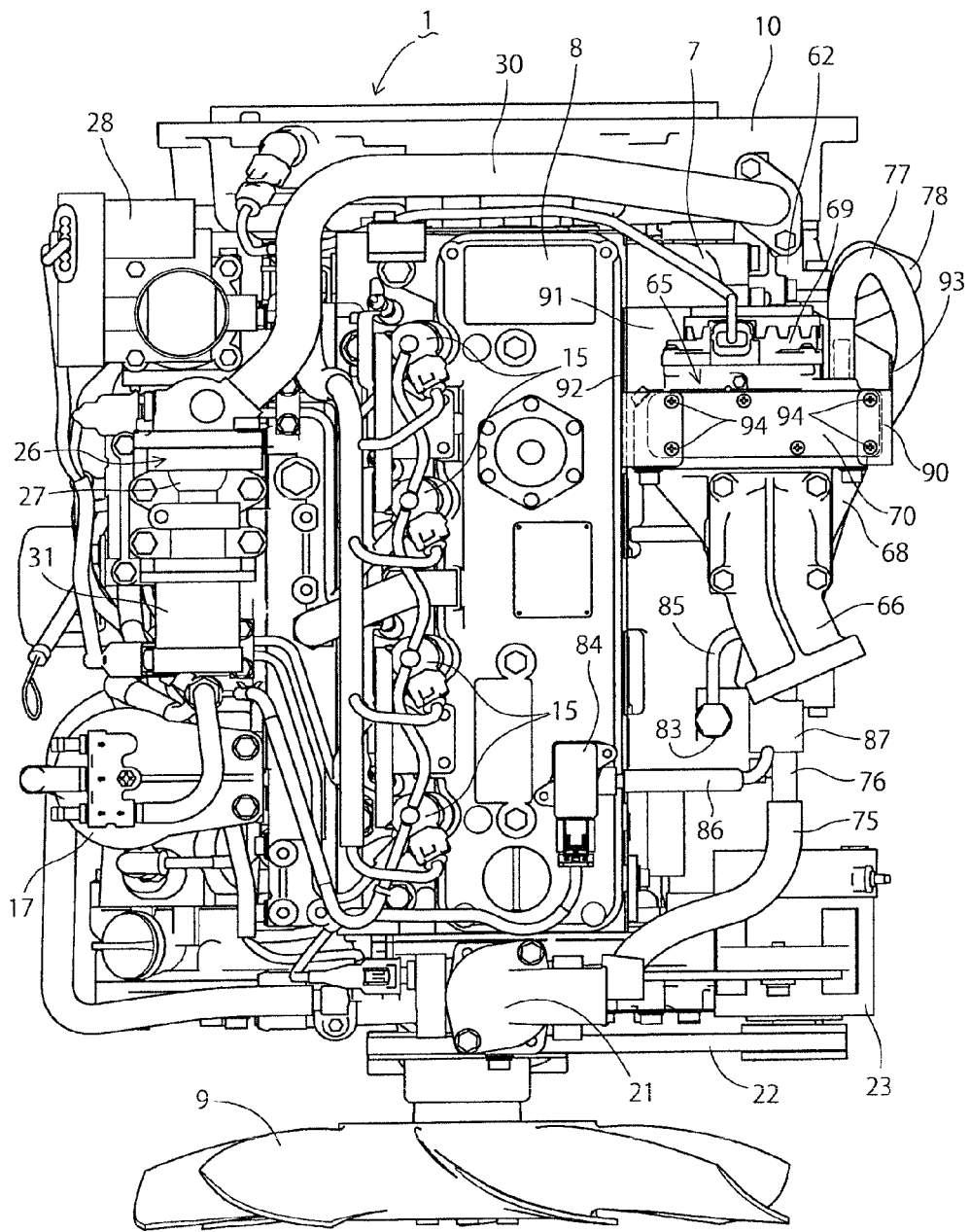
FIG. 6 is a plan view of the diesel engine.
Figure 7:
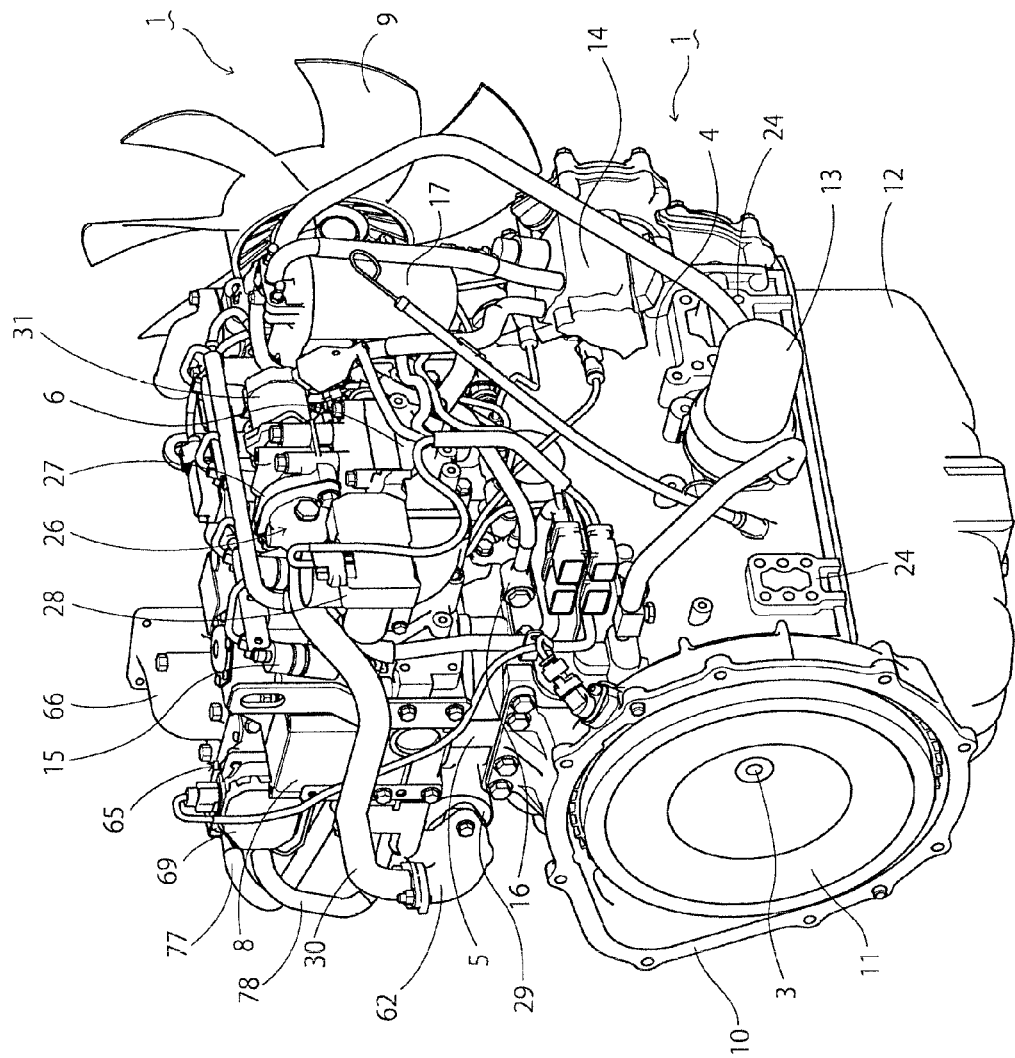
FIG. 7 is a perspective view of the diesel engine as viewed from left.
Figure 8:
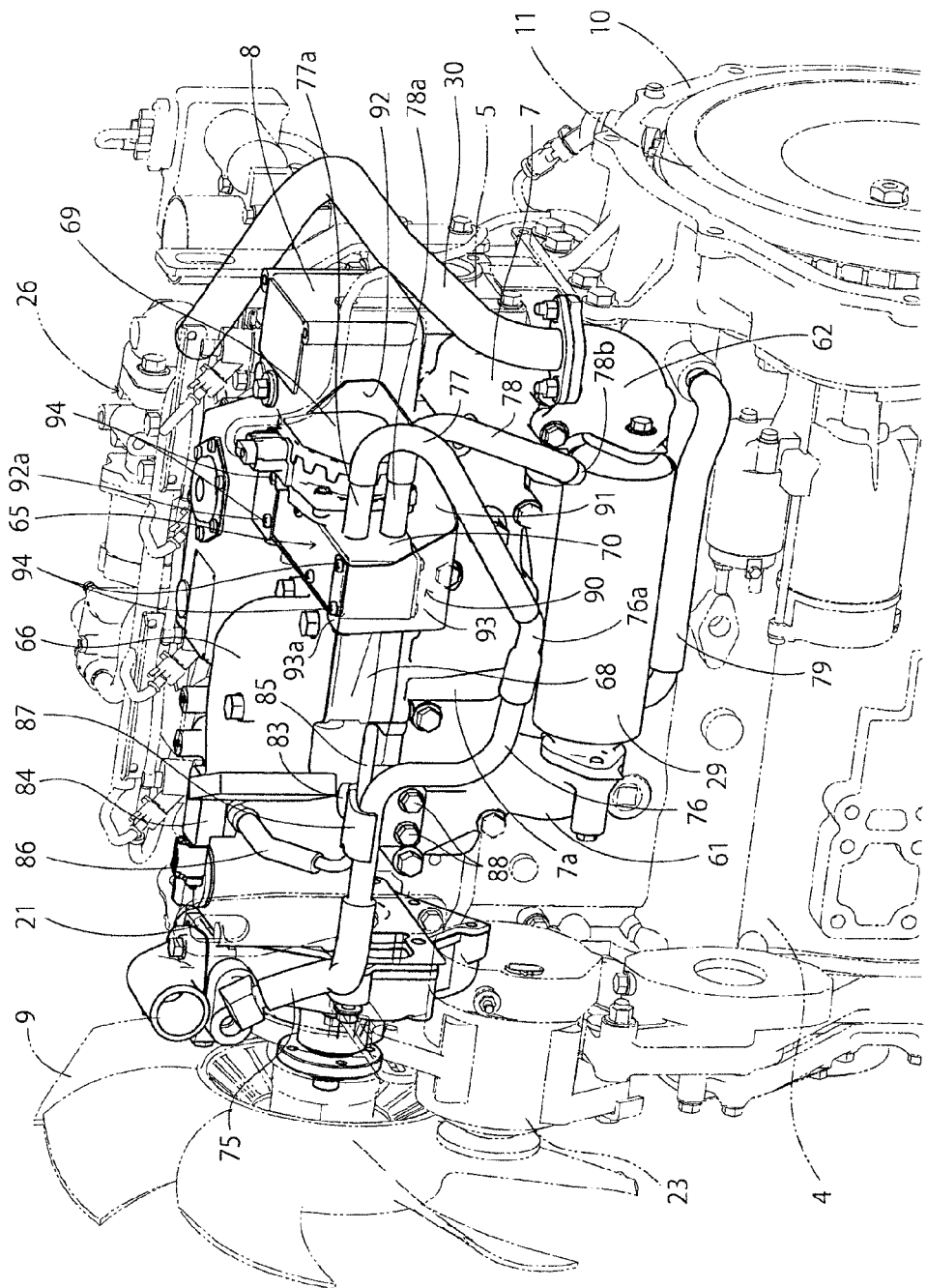
FIG. 8 is a perspective view of an exhaust manifold portion as viewed from left.
Figure 9:
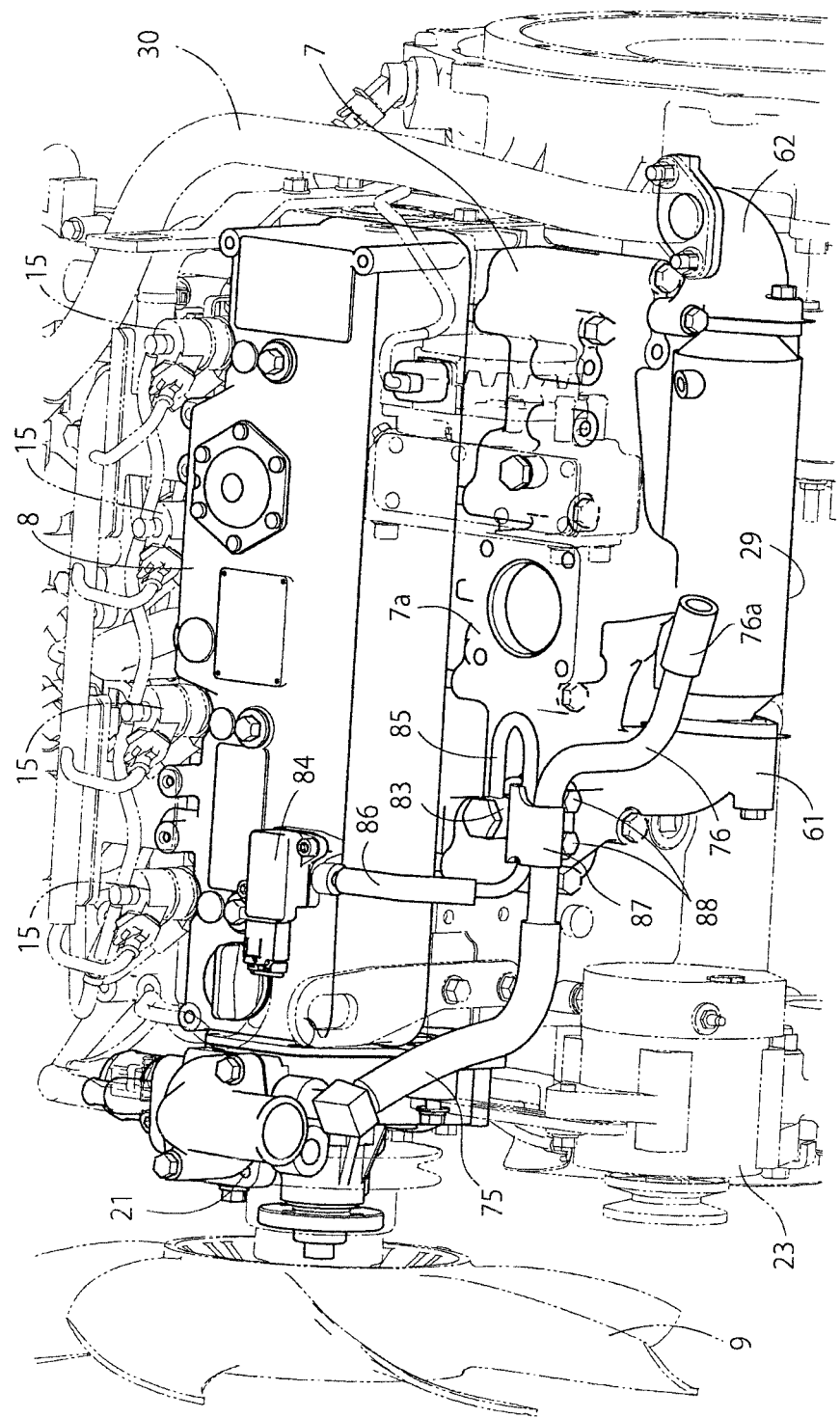
FIG. 9 is a perspective view of the exhaust manifold portion as viewed from above.
Figure 10:
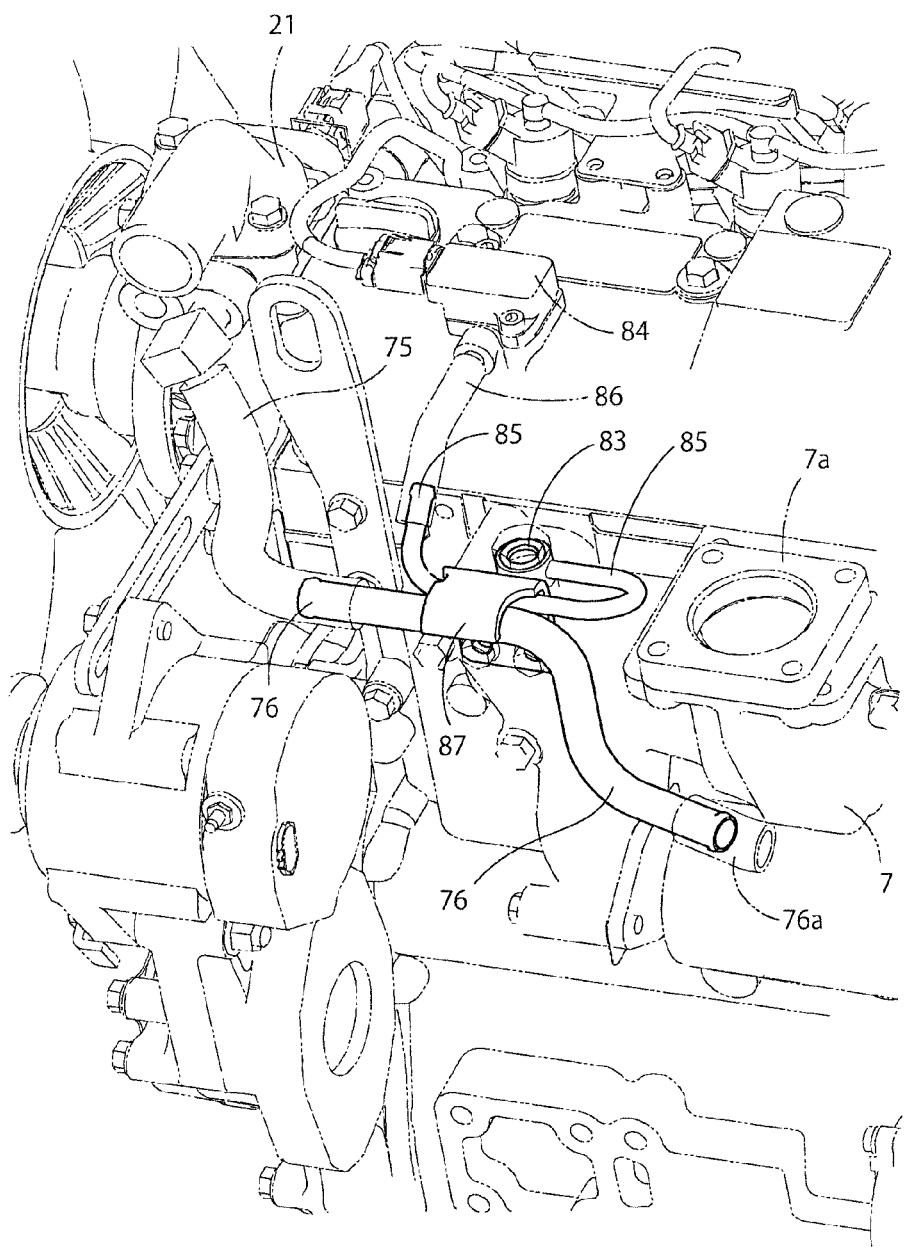
FIG. 10 is a perspective view of a cooling water pipe.

An embodiment of an engine device of the present invention of the application will be described below with reference to FIGS. 1 to 17. A diesel engine 1 is provided in a construction machine, a civil engineering machine, an agricultural machine or a cargo-handling machine as a prime mover. The diesel engine 1 includes a continuous regeneration type exhaust gas purification device 2 (diesel particulate filter). The exhaust gas purification device 2 removes particulate material (PM) in exhaust gas of the diesel engine 1, and reduces carbon monoxide (CO) and hydrocarbon (HC) in exhaust gas of the diesel engine 1.

The diesel engine 1 includes a cylinder block 4 provided with an engine output crankshaft 3 and pistons (not shown) therein. A cylinder head 5 is placed on the cylinder block 4. An intake manifold 6 is placed on a right side surface of the cylinder head 5. An exhaust manifold 7 is placed on a left side surface of the cylinder head 5. A head cover 8 is placed on an upper surface of the cylinder head 5. A cooling fan 9 is placed on a front surface of the cylinder block 4. A flywheel housing 10 is placed on a rear surface of the cylinder block 4. A flywheel 11 is placed in the flywheel housing 10.

The flywheel 11 is rotatably supported by the crankshaft 3 (engine output shaft). Power of the diesel engine 1 is supplied to an operating portion of a utility vehicle (such as backhoe and forklift) through the crankshaft 3. An oil pan 12 is placed on a lower surface of the cylinder block 4. Lubricant oil in the oil pan 12 is supplied to lubrication portions of the diesel engine 1 through an oil filter 13 placed on a side surface of the cylinder block 4.

A fuel supply pump 14 for supplying fuel is mounted on a portion of a side surface of the cylinder block 4 located above the oil filter 13 (below intake manifold 6). The diesel engine 1 is provided with injectors 15 of four cylinders each having an electromagnetic opening/closing control type fuel injection valve (not shown). A fuel tank (not shown) provided in the utility vehicle is connected to each of the injectors 15 through the fuel supply pump 14, a cylindrical common rail 16 and a fuel filter 17.

Fuel in the fuel tank is sent, under pressure, from the fuel supply pump 14 to the common rail 16 through the fuel filter 17 and the high pressure fuel is stored in the common rail 16. By controlling the opening and closing operations of the fuel injection valves of the injectors 15, and the high pressure fuel in the common rail 16 is injected from the injectors 15 into the cylinders of the diesel engine 1.

A cooling water pump 21 for circulating cooling water is placed on a left portion of a front surface of the cylinder block 4. The cooling water pump 21 is placed coaxially with a fan shaft of the cooling fan 9. The cooling water pump 21 is driven together with the cooling fan 9 by rotation of the crankshaft 3 through a V-belt 22 which drives the cooling fan. By driving the cooling water pump 21, cooling water in a radiator (not shown) provided in the utility vehicle is supplied to the cooling water pump 21. Cooling water is supplied to the cylinder block 4 and the cylinder head 5 to cool the diesel engine 1. An alternator 23 is placed on a left side of the cooling water pump 21.

Engine foot mounting portions 24 are respectively provide on right and left side surfaces of the cylinder block 4. An engine foot body (not shown) having a rubber vibration insulator is fastened to each of the engine foot mounting portions 24 through a holt. The diesel engine 1 is supported to the utility vehicle (engine-mounting chassis such as backhoe and forklift car) through the engine foot bodies in a vibration isolation manner.

EGR device 26 (exhaust gas recirculating device) will be described. An air cleaner (not shown) is connected to an inlet of the upwardly projecting intake manifold 6 through an EGR device 26 (exhaust gas recirculating device). Fresh air (outside air) is sent from the air cleaner to the intake manifold 6 through the EGR device 26.

The EGR device 26 includes an EGR body case 27 (collector) which mixes a portion (EGR gas from exhaust manifold) of exhaust gas of the diesel engine and fresh air (outside air from air cleaner) with each other and supplies the mixture to the intake manifold 6, an intake throttle member 28 which brings the EGR body case 27 into communication with the air cleaner, a recirculating exhaust gas pipe 30 as a reflux pipe which is connected to the exhaust manifold 7 through an EGR cooler 29, and an EGR valve member 31 which brings the EGR body case 27 into communication with the recirculating exhaust gas pipe 30.

That is, the intake manifold 6 and the intake throttle member 28 are connected to each other through the EGR body case 27. The intake throttle member 28 introduces fresh air. An outlet side of the recirculating exhaust gas pipe 30 which extends from the exhaust manifold 7 is in communication with the EGR body case 27. The EGR body case 27 is formed into a long cylindrical shape. The intake throttle member 28 is fastened to one longitudinal end of the EGR body case 27 through a bolt. A downwardly pointing opening end of the EGR body case 27 is detachably fastened to an inlet of the intake manifold 6 through a bolt.

An outlet of the recirculating exhaust gas pipe 30 is connected to the EGR body case 27 through the EGR valve member 31. An inlet side of the recirculating exhaust gas pipe 30 is connected to a lower surface of the exhaust manifold 7 through the EGR cooler 29. By adjusting an opening degree of the EGR valve (not shown) in the EGR valve member 31, a supply amount of EGR gas supplied to the EGR body case 27 is adjusted.

With the above-described configuration, fresh air (outside air) is supplied from the air cleaner to the EGR body case 27 through the intake throttle member 28, and EGR gas (a portion of exhaust gas discharged from exhaust manifold) is supplied from the exhaust manifold 7 to the EGR body case 27 through the EGR valve member 31. After the fresh air from the air cleaner and the EGR gas from the exhaust manifold 7 are mixed with each other in the EGR body case 27, the mixture gas in the EGR body case 27 is supplied to the intake manifold 6. That is, a portion of exhaust gas discharged from the diesel engine 1 to the exhaust manifold 7 is refluxed from the intake manifold 6 to the diesel engine 1. According to this, maximum combustion temperature at the high load operation is lowered, and a discharge amount of NOx (nitrogen oxides) from the diesel engine is reduced.

Next, the exhaust gas purification device 2 will be described with reference to FIGS. 1 and 11. The exhaust gas purification device 2 includes an exhaust gas purification case 38 having a purification inlet pipe 36 and a purification outlet pipe 37. A diesel oxidation catalyst 39 (gas purification body) such as platinum for producing nitrogen dioxide ($NO_2$) and a soot filter 40 (gas purification body) of a honeycomb structure which continuously oxidizes and removes collected particulate material (PM) at relatively low temperature are arranged in the exhaust gas purification case 38 in series in a moving direction (from lower side to upper side in FIG. 1) of exhaust gas. One side of the exhaust gas purification case 38 is formed from a muffler 41, and the purification outlet pipe 37 connected to a tail pipe 135 is provided in the muffler 41.

With the above-described configuration, nitrogen dioxide (NO2) produced by oxidation effect of the diesel oxidation catalyst 39 is supplied from one side end surface (intake side end surface) into a soot filter 40. Particulate material (PM) included in exhaust gas of the diesel engine 1 is collected by the soot filter 40, and is continuously oxidized and removed by the nitrogen dioxide (NO2). The particulate material (PM) in exhaust gas of the diesel engine 1 is removed, and contents of carbon monoxide (CO) and hydrocarbon (HC) in exhaust gas of the diesel engine 1 are reduced.

Thermistor type upstream gas temperature sensor 42 and downstream gas temperature sensor 43 belong to the exhaust gas purification case 38. The upstream gas temperature sensor 42 detects temperature of exhaust gas of a gas inflow end surface of the diesel oxidation catalyst 39. The downstream gas temperature sensor 43 detects temperature of exhaust gas of a gas outflow end surface of the diesel oxidation catalyst.

A differential pressure sensor 44 as an exhaust gas pressure sensor belongs to the exhaust gas purification case 38. The differential pressure sensor 44 detects a difference in exhaust gas pressure between an upstream side and a downstream side of the soot filter 40. Based on the difference in exhaust gas pressure between the upstream side and the downstream side of the soot filter 40, an amount of sediment of particulate material in the soot filter 40 is calculated, and a clogged state in the soot filter 40 can be grasped.

Figure 11:
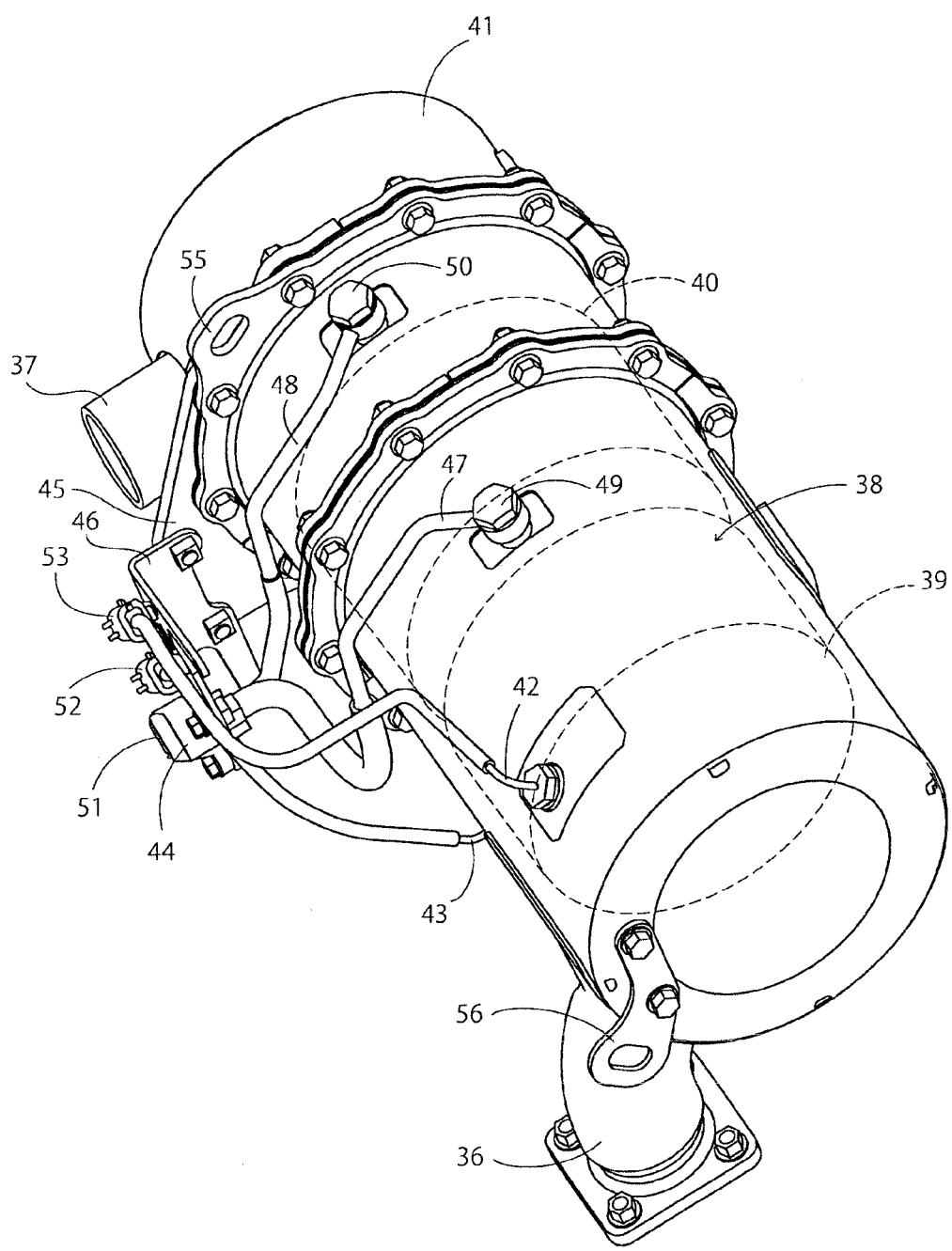
FIG. 11 is a perspective view of an outward appearance of an exhaust gas purification device.
Figure 12:
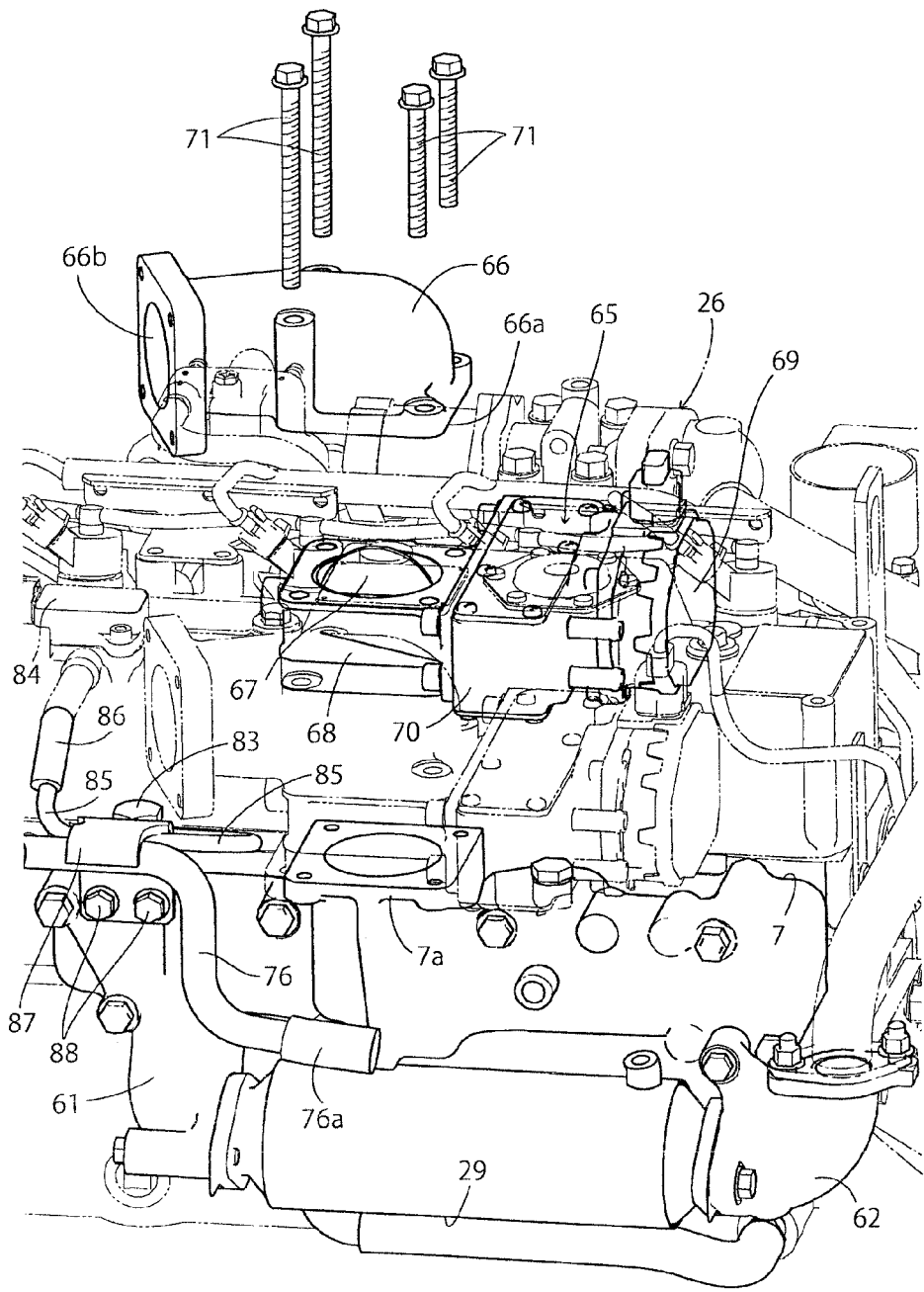
FIG. 12 is an exploded perspective view of an exhaust throttle device.
Figure 13:
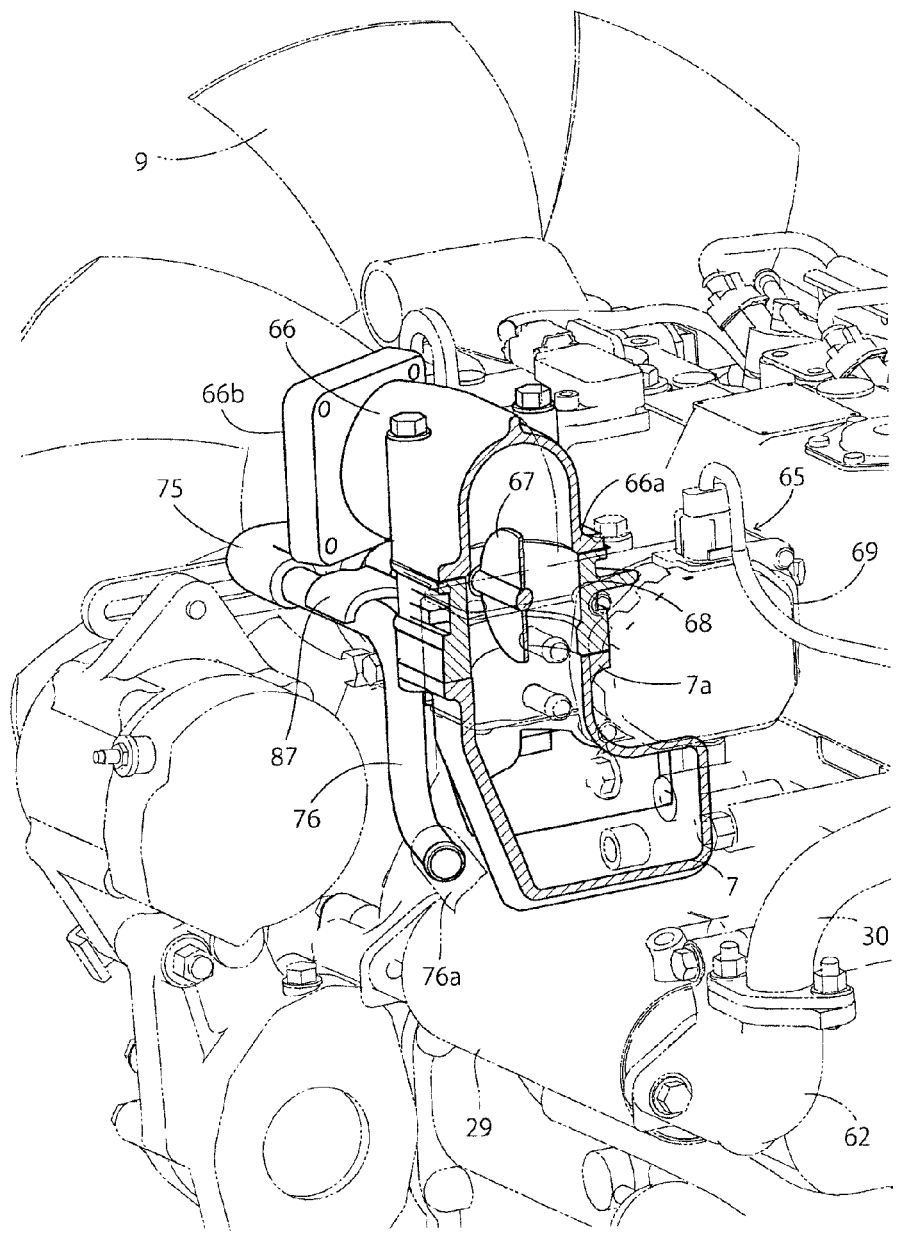
FIG. 13 is a longitudinal sectional view of the exhaust throttle device.
Figure 14:
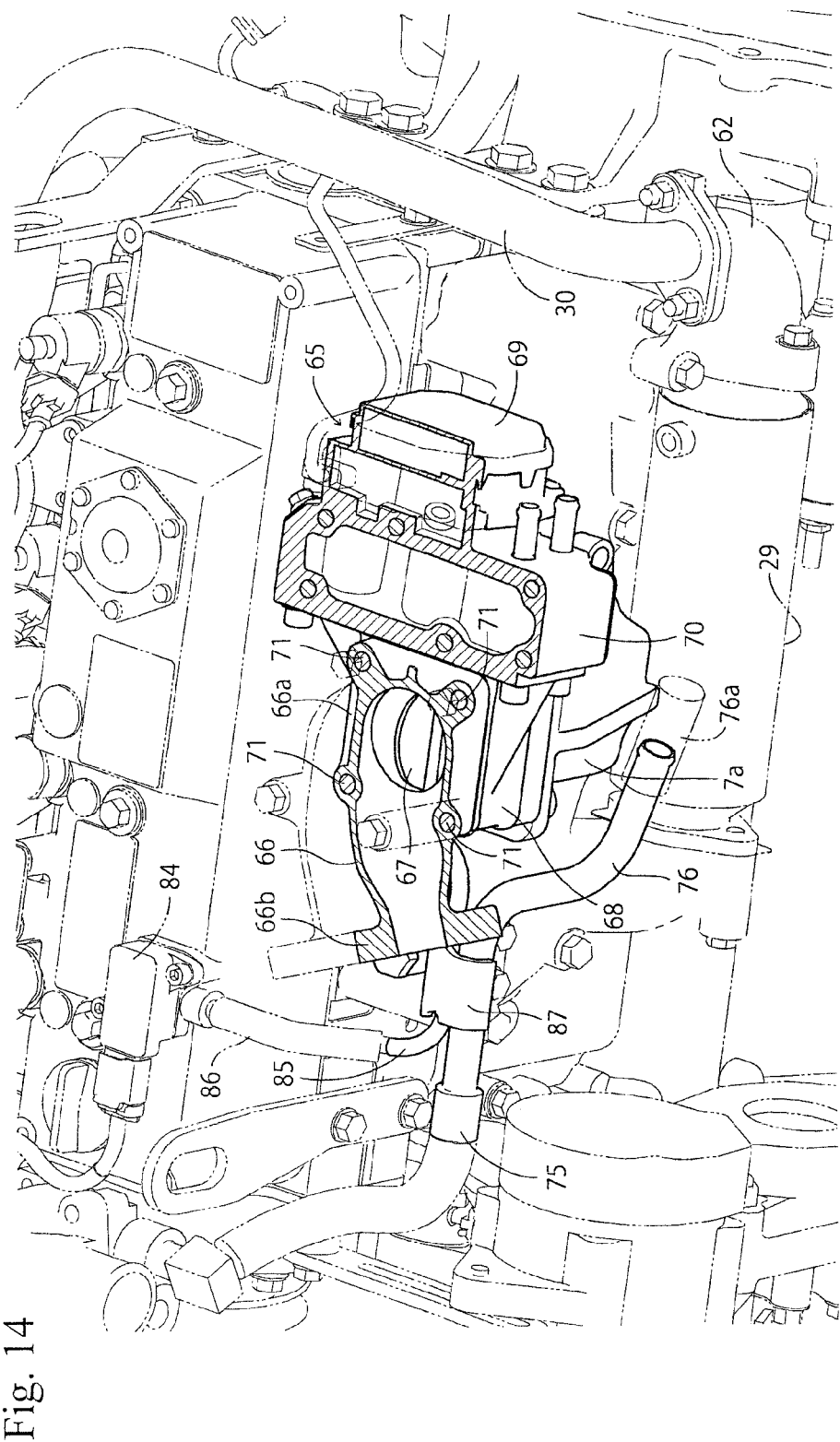
FIG. 14 is a transverse sectional view of the exhaust throttle device.
Figure 15:
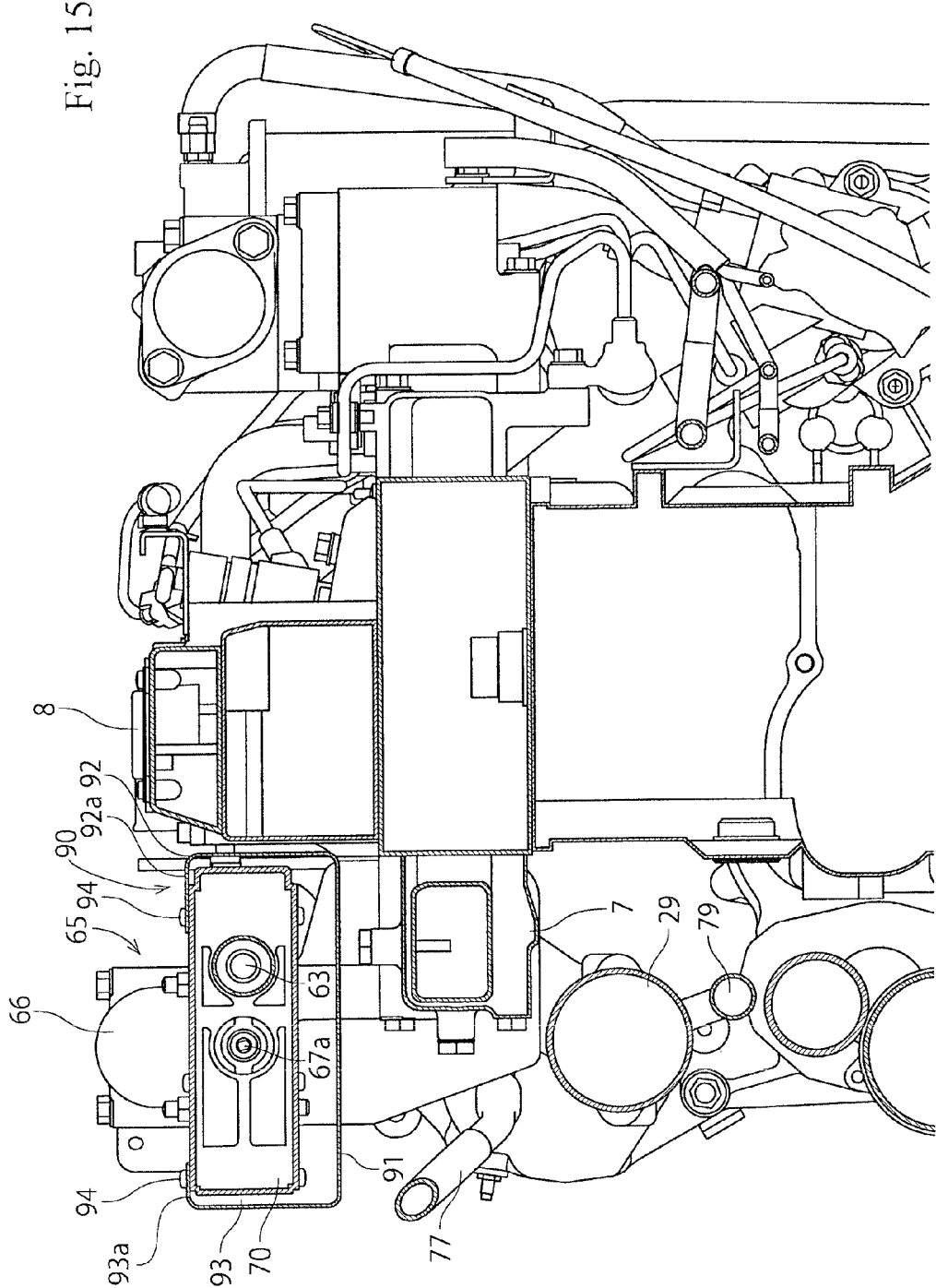
FIG. 15 is a longitudinal sectional view of the diesel engine.
Figure 16:
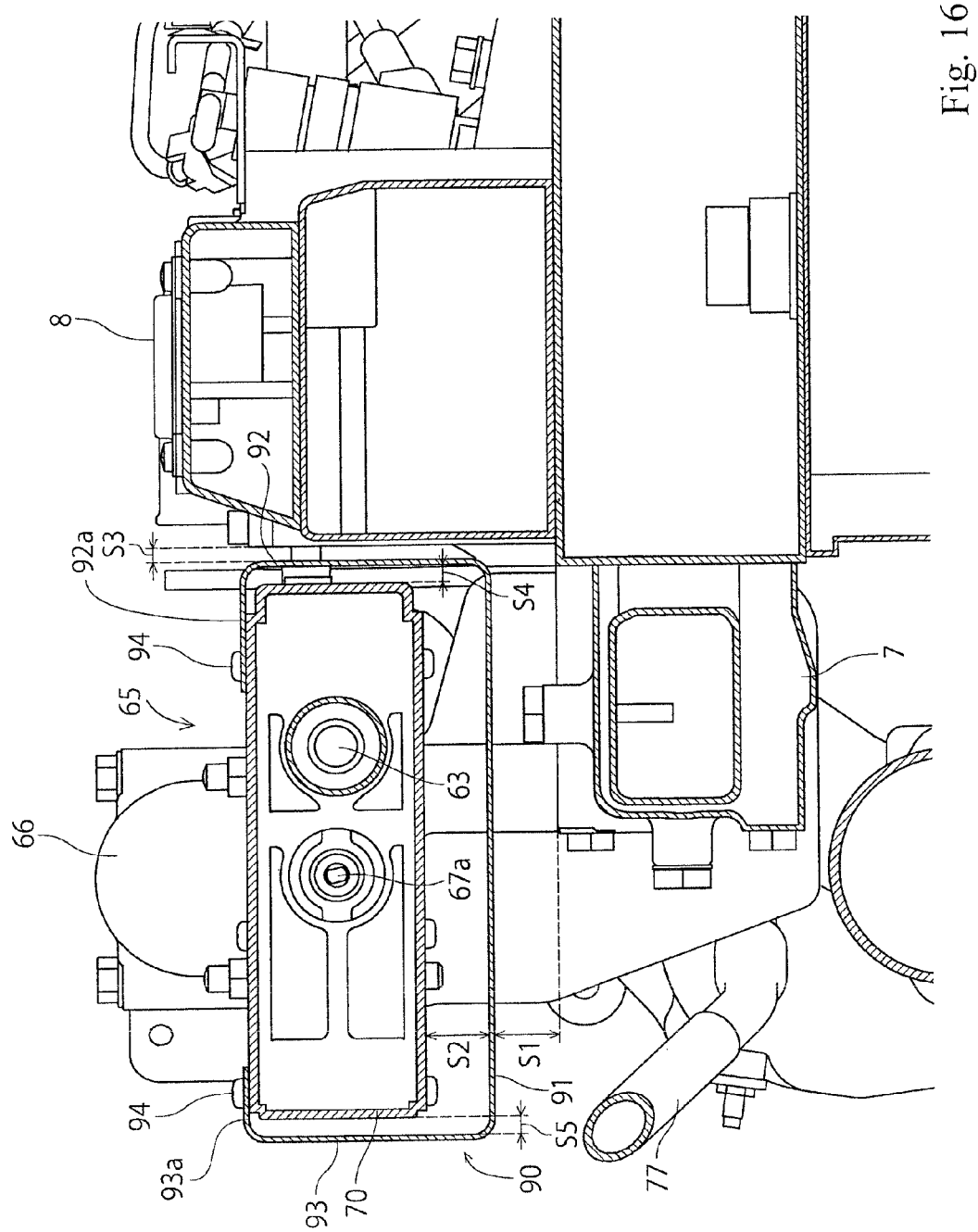
FIG. 16 is an enlarged sectional view of peripheries of the exhaust throttle device in FIG. 15.
Figure 17:
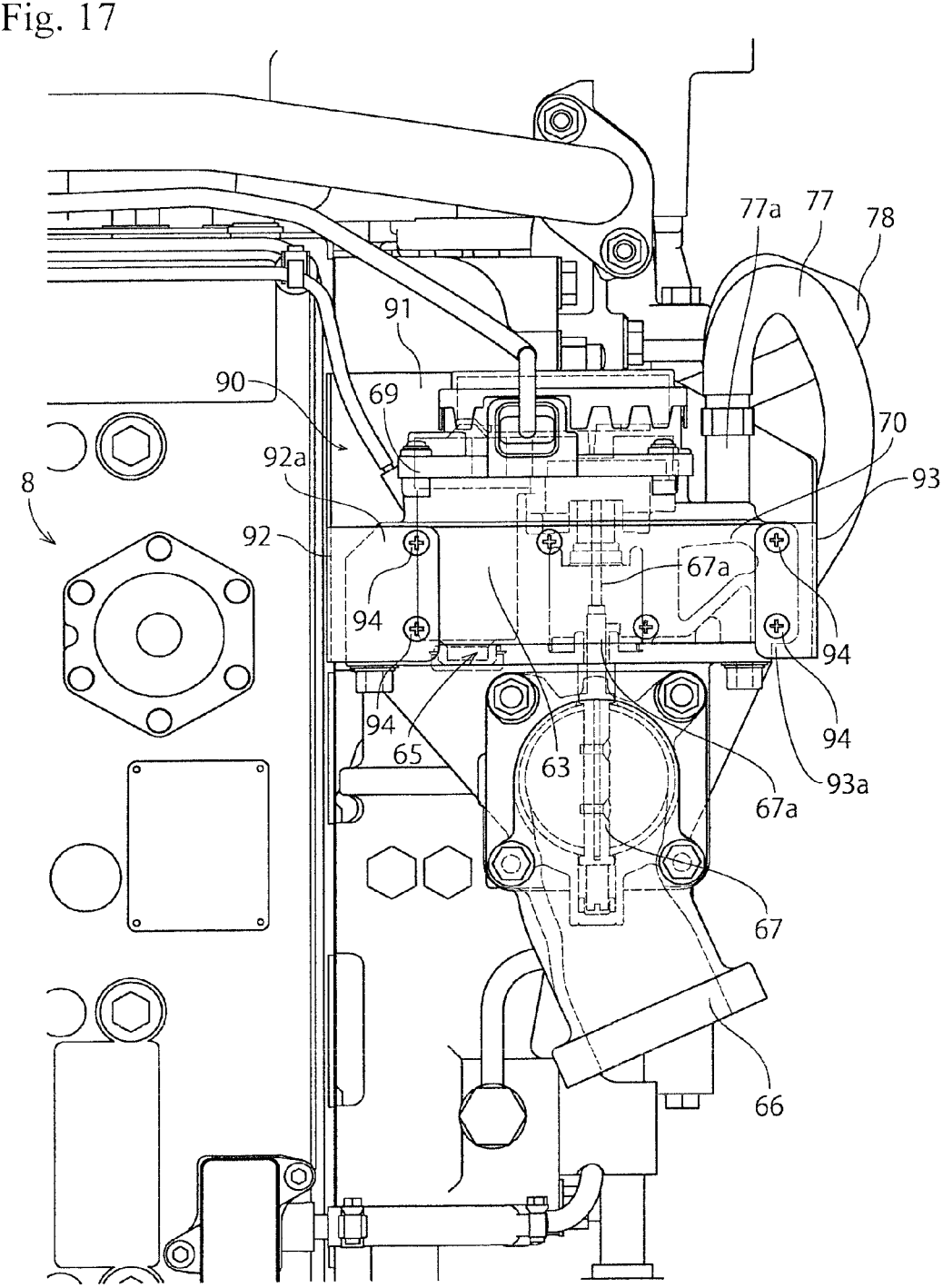
FIG. 17 is a plan view of peripheries of the exhaust throttle device.

As shown in FIGS. 1 and 11, a sensor bracket 46 is fastened to an outlet pinching flange 45 of the exhaust gas purification case 38 through a bolt, and the sensor bracket 46 is placed on an outer surface of the exhaust gas purification case 38. The differential pressure sensor 44 is integrally provided with an electric wire connector, and the differential pressure sensor 44 is mounted on the sensor bracket 46. The differential pressure sensor 44 is placed on the outer surface of the exhaust gas purification case 38. One ends of an upstream sensor pipe 47 and a downstream sensor pipe 48 are connected to the differential pressure sensor 44. Upstream and downstream sensor pipe boss bodies 49 and 50 are placed on the exhaust gas purification case 38 such that the sensor pipe boss bodies 49 and 50 pinch the soot filter 40 in the exhaust as purification case 38. The other ends of the upstream sensor pipe 47 and the downstream sensor pipe 48 are respectively connected to the sensor pipe boss bodies 49 and 50.

With the above-described configuration, a difference (pressure difference of exhaust gas) between inflow exhaust gas pressure of the soot filter 40 and outflow exhaust gas pressure of the soot filter 40 is detected through the differential pressure sensor 44. Since a remaining amount of particulate material in exhaust gas collected by the soot filter 40 is proportional to a pressure difference of exhaust gas, when an amount of particulate material remaining in the soot filter 40 increases more than a predetermined value, regeneration control (control for increasing exhaust gas temperature for example) for reducing an amount of particulate material of the soot filter 40 is conducted based on a result of detection of the differential pressure sensor 44. If the remaining amount of particulate material further increases more than a regeneration-controllable range, a maintenance operation is conducted such that the exhaust gas purification case 38 is detached and disassembled, the soot filter 40 is cleaned and particulate material is artificially removed.

An outer case of the differential pressure sensor 44 is integrally provided with an electric wire connector 51, and an electric wire connector 52 of the upstream gas temperature sensor 42 and an electric wire connector 53 of the downstream gas temperature sensor 43 are fixed to the sensor bracket 46. Connecting directions of the electric wire connector 51 of the differential pressure sensor 44, the electric wire connector 52 of the upstream gas temperature sensor 42 and the electric wire connector 53 of the downstream gas temperature sensor 43 are set into the same direction and in this attitude, these connectors 51, 52 and 53 are supported. Therefore, the connecting operability of the connectors 51, 52 and 53 can be enhanced.

A hanging body 55 is integrally formed on the outlet pinching flange 45 of the exhaust gas purification case 38, and hanging hardware 56 is fastened, through a bolt, to an exhaust gas-inlet side surface of the exhaust gas purification case 38 provided with the purification inlet pipe 36. The hanging body 55 and hanging hardware 56 are placed in a direction of a diagonal line of the exhaust gas purification case 38 such that the hanging body 55 and the hanging hardware 56 are separated from each other. In an assembling factory or the like of the diesel engine 1, the hanging body 55 and the hanging hardware 56 are engaged with a hook (not shown) such as a chain block, the exhaust gas purification case 38 is hanged from and supported by a chain block or the like, and the exhaust gas purification case 38 is assembled with the diesel engine 1. Since the hanging body 55 and the hanging hardware 56 are placed in the diagonal line, it is possible to hang the heavy exhaust gas purification case 38 in a stable attitude.

Next, as shown in FIGS. 1 and 8 to 10, an EGR gas-intake pipe 61 is integrally formed on the exhaust manifold 7. A pipe coupling member 62 is fastened to the exhaust manifold 7 through a holt. An EGR gas inlet of the EGR cooler 29 is supported by the EGR gas-intake pipe 61, and an EGR gas outlet of the EGR cooler 29 is supported by the pipe coupling member 62 which connects the recirculating exhaust gas pipe 30. According to this, the EGR cooler 29 is placed such that it is separated from the cylinder block 4 (more specifically, from left side surface thereof).

As shown in FIGS. 1, 8 and 12 to 17, the engine device includes an exhaust throttle device 65 which increases exhaust gas pressure of the diesel engine 1. An exhaust gas outlet body 7a of the exhaust manifold 7 opens upwardly. The exhaust gas outlet body 7a of the exhaust manifold 7 is detachably connected to an elbow-shaped relay pipe 66 through the exhaust throttle device 65 which adjusts exhaust gas pressure of the diesel engine 1. The exhaust throttle device 65 includes a throttle valve case 68 having the exhaust throttle valve 67 therein, an actuator case 69 in which a power transmission mechanism from a motor (actuator) 63 which controls an opening operation of the exhaust throttle valve 67 is incorporated, and a water-cool case 70 which connects the actuator case 69 to the throttle valve case 68. The motor 63 is configured such that its rotation shaft can be operated by the power transmission mechanism in an interlocking manner with a rotation shaft 67a of the exhaust throttle valve 67 in the throttle valve case through a gear.

The throttle valve case 68 is placed on the exhaust gas outlet body 7a, the relay pipe 66 is placed on the throttle valve case 68, and the relay pipe 66 is fastened, by means of four bolts 71, to the exhaust gas outlet body 7a through the throttle valve case 68. A lower surface of the throttle valve case 68 is fixed to the exhaust gas outlet body 7a. A lower surface opening 66a of the relay pipe 66 is fixed to an upper surface of the throttle valve case 68. A lateral opening 66b of the relay pipe 66 is connected to the purification inlet pipe 36 through an exhaust pipe 72. Therefore, the exhaust manifold 7 is connected to the exhaust gas purification device 2 through the relay pipe 66 and the exhaust throttle device 65. Exhaust gas which moves from the outlet of the exhaust manifold 7 into the exhaust gas purification device 2 through the purification inlet pipe 36 is purified by the exhaust gas purification device 2 and then, the exhaust gas moves from the purification outlet pipe 37 to a tail pipe (not shown), and is eventually discharged outside of the engine device.

With the above-described configuration, the motor 63 of the exhaust throttle device 65 is operated based on a pressure difference detected by the differential pressure sensor 44, thereby executing regeneration control of the soot filter 40. That is, when soot is accumulated on the soot filter 40, exhaust gas pressure of the diesel engine 1 is increased by control for closing the exhaust throttle valve 67 of the exhaust throttle device 65, thereby increasing temperature of exhaust gas which is discharged from the diesel engine 1 to high temperature, and soot accumulated on the soot filter 40 is burned. As a result, soot disappears, and the soot filter 40 is regenerated.

Further, even when an operation (operation in which soot is prone to be accumulated) in which a load is small and temperature of exhaust gas is prone to become low is continuously carried out, the soot filter 40 can be regenerated by forcibly increasing exhaust gas pressure by the exhaust throttle device 65, and it is possible to appropriately maintain the exhaust gas purification ability of the exhaust gas purification device 2. A burner or the like for burning soot accumulated on the soot filter 40 is also unnecessary. When the engine 1 is started, it is possible to increase temperature of exhaust gas from the diesel engine 1 to high temperature by increasing exhaust gas pressure of the diesel engine 1 by control of the exhaust throttle device 65, and it is possible to facilitate warming up of the diesel engine 1.

As shown in FIGS. 1, 8 and 12 to 17, in the engine device which has the engine 1 including the exhaust manifold 7 and which adjusts exhaust gas pressure of the exhaust manifold 7 by the exhaust throttle device 65, the exhaust gas intake side of the throttle valve case 68 of the exhaust throttle device 65 is fastened to the exhaust gas outlet of the exhaust manifold 7, and the exhaust pipe 72 is connected to the exhaust manifold 7 through the throttle valve case 68. Therefore, the exhaust throttle device 65 can be supported to the high rigidity exhaust manifold 7, and the support structure of the exhaust throttle device 65 can be made as a high rigidity structure. As compared with a structure in which the throttle valve case 68 is connected to the exhaust manifold 7 through the relay pipe 66 for example, it is possible to reduce a capacity of the exhaust gas intake side of the exhaust throttle device 65, and to precisely adjust exhaust gas pressure in the exhaust manifold 7. For example, temperature of exhaust gas supplied to the exhaust gas purification device 2 and the like can easily be maintained at temperature suitable for purification of exhaust gas.

As shown in FIGS. 8 and 12 to 17, the throttle valve case 68 is fastened to the upper surface of the exhaust manifold 7, the relay pipe 66 is fastened to the upper surface of the throttle valve case 68, the throttle valve case 68 and the relay pipe 66 are placed in a multi-layered form with respect to the exhaust manifold 7, and the exhaust pipe 72 is connected to the relay pipe 66 of the uppermost layer. Therefore, it is possible to change a mounting attitude (connecting direction of exhaust pipe 72) of the relay pipe 66 in accordance with a mounting position of the exhaust gas purification device 2 for example without changing a support attitude of the exhaust throttle device 65 and without changing specifications of the relay pipe 66.

As shown in FIGS. 1, 8 and 12 to 17, the exhaust gas outlet of the exhaust manifold 7 upwardly opens, the throttle valve case 68 is provided on the upper surface of the exhaust manifold 7, and a throttle valve gas outlet 68a is formed in the upper surface of the throttle valve case 68. The EGR cooler 29 for cooling EGR gas is placed below the throttle valve case 68 such that the exhaust manifold 7 is interposed between the throttle valve case 68 and the EGR cooler 29. Therefore, the exhaust manifold 7, the exhaust throttle device 65 and the EGR cooler 29 can compactly be placed along one side surface of the engine 1, and the exhaust pipe 72 can be made to extend laterally or upwardly from the throttle valve gas outlet 68a of the throttle valve case 68 in accordance with placement or the like of the exhaust gas purification device 2 for example. Therefore, the exhaust gas purification device 2 can functionally be supported inside or outside (constituent part other than diesel engine 1) of an engine room of the utility vehicle. It is possible to compactly support the cooling water pipe (such as throttle outlet pipe 77 and throttle inlet pipe 78) which is connected to the exhaust throttle device 65 and the EGR cooler 29 while utilizing the outer surface of the exhaust manifold 7.

The cooling water path (such as flexible cooling water return hose 75, throttle outlet pipe 77, throttle inlet pipe 78 and cooling water intake hose 79) which connects the cooling water pump 21 to the EGR cooler 29 and the exhaust throttle device 65 is provided on the left side (on the side of exhaust manifold 7) of the diesel engine 1. Cooling water from the cooling water pump 21 is not only supplied to a water-cool portion of the diesel engine 1 but also a portion of the cooling water is sent to the EGR cooler 29 and the exhaust throttle device 65.

One end of an alloy intermediate pipe 76 is connected to the return hose 75, and one end of the alloy throttle outlet pipe 77 is connected to the other end of the alloy intermediate pipe 76 through a flexible hose 76a. The other end of the throttle outlet pipe 77 is connected to the water-cool case 70 of the exhaust throttle device 65 through a flexible hose 77a, and one end of the alloy throttle inlet pipe 78 is connected to the water-cool case 70 through a flexible hose 78a. The other end of the throttle inlet pipe 78 is connected to a cooling water drainage port of the EGR cooler 29 through a flexible hose 78b. A cooling water intake port of the EGR cooler 29 is connected to the cylinder block 4 through the cooling water intake hose 79.

That is, the EGR cooler 29 and the exhaust throttle device 65 are connected to the cooling water pump 21 in series, in a cooling water flow path formed by the hoses 75, 76a, 77a, 78a, 78b and 79 and, the pipes 76 to 78, the exhaust throttle device 65 is placed between the cooling water pump 21 and the EGR cooler 29. The exhaust throttle device 65 is located upstream of the EGR cooler 29. A portion of cooling water from the cooling water pump 21 is supplied from the cylinder block 4 to the exhaust throttle device 65 through the EGR cooler 29, and is circulated.

The portion of cooling water is supplied to the exhaust throttle device 65 as described above, and cooling water is supplied from the throttle outlet pipe 77 to the exhaust throttle device 65. The exhaust throttle device 65 discharges cooling water to the throttle inlet pipe 78. Therefore, a water supply position and a drainage position of cooling water to the water-cool case 70 are opposite from an intake position and an exhaust position of exhaust gas flowing through the throttle valve case 68. That is, since the water supply position of cooling water of the water-cool case 70 is located upstream of the drainage position, it is possible to more reliably prevent cooling water flowing through the water-cool case 70 from reversely flowing.

To more reliably realize the cooling effect of the water-cool case 70 in the exhaust throttle device 65, a heat shield member 90 is provided such that it surrounds the exhaust throttle device 65. The heat shield member 90 is formed by bending a metal plate such that front and rear surfaces thereof open, and the heat shield member 90 covers right and left sides and a lower side of the exhaust throttle device 65. That is, the heat shield member 90 includes a heat shield plate 91 located between the exhaust manifold 7, the actuator case 69 and the water-cool case 70, and also includes metal plates 92 and 93 vertically standing from right and left end sides of the heat shield plate 91.

At this time, the heat shield plate 91 is placed at a position having gaps S1 and S2 respectively from the exhaust manifold. 7 and the exhaust throttle device 65 below the exhaust throttle device 65, and the heat shield plate 91 blocks radiation heat from the exhaust manifold 7. The metal plate 92 located on the right side of the heat shield plate 91 is located at a position having gaps S3 and S4 respectively from the head cover 8 and the exhaust throttle device 65, and the metal plate 92 blocks radiation heat from the body of the diesel engine 1. The metal plate 93 located on the left side of the heat shield plate 91 is located at a position having a gap S5 from the exhaust throttle device 65.

Cross sections of the metal plates 92 and 93 are bent into L-shape at ends opposite from connected portions with the heat shield plate 91. The metal plates 92 and 93 respectively include support connecting portions 92a and 93a which abut against an upper surface of the water-cool case 70. According to this, the support connecting portions 92a and 93a are connected to the water-cool case 70 through screws 94, and the heat shield member 90 is hanged from and supported by the exhaust throttle device 65.

The heat shield member 90 configured as described above is placed such that it is not in contact with the exhaust manifold 7 and the head cover 8, and a space is provided between the exhaust manifold 7 and the head cover 8 of the exhaust throttle device 65. Therefore, the heat shield member 90 shields the exhaust throttle device 65 from radiation heat from peripheries of the exhaust throttle device 65, and it is possible to enhance the cooling effect achieved by cooling water flowing through the water-cool case 70.

Figure 18:
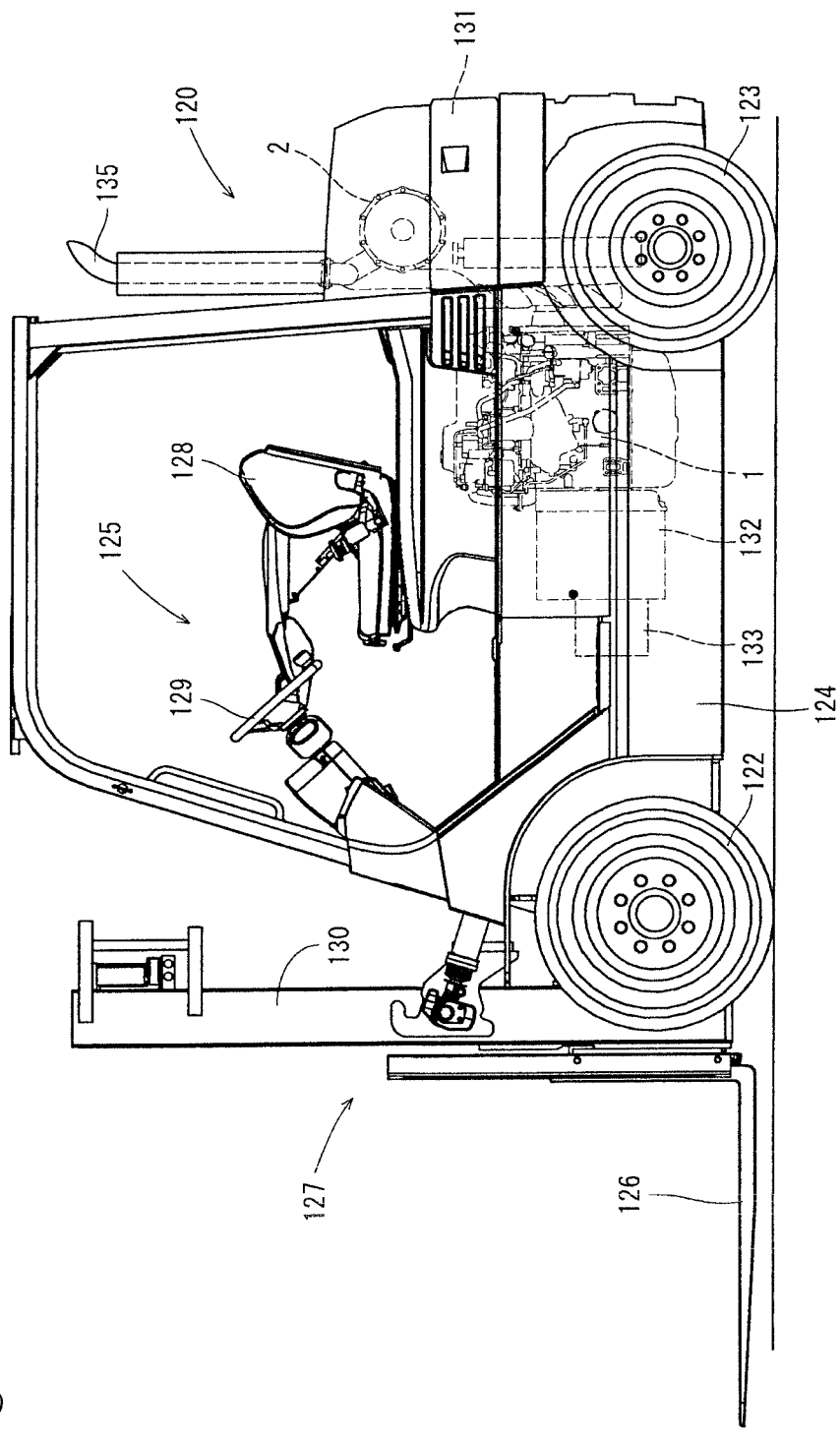
FIG. 18 is a side view of a forklift car.
Figure 19:
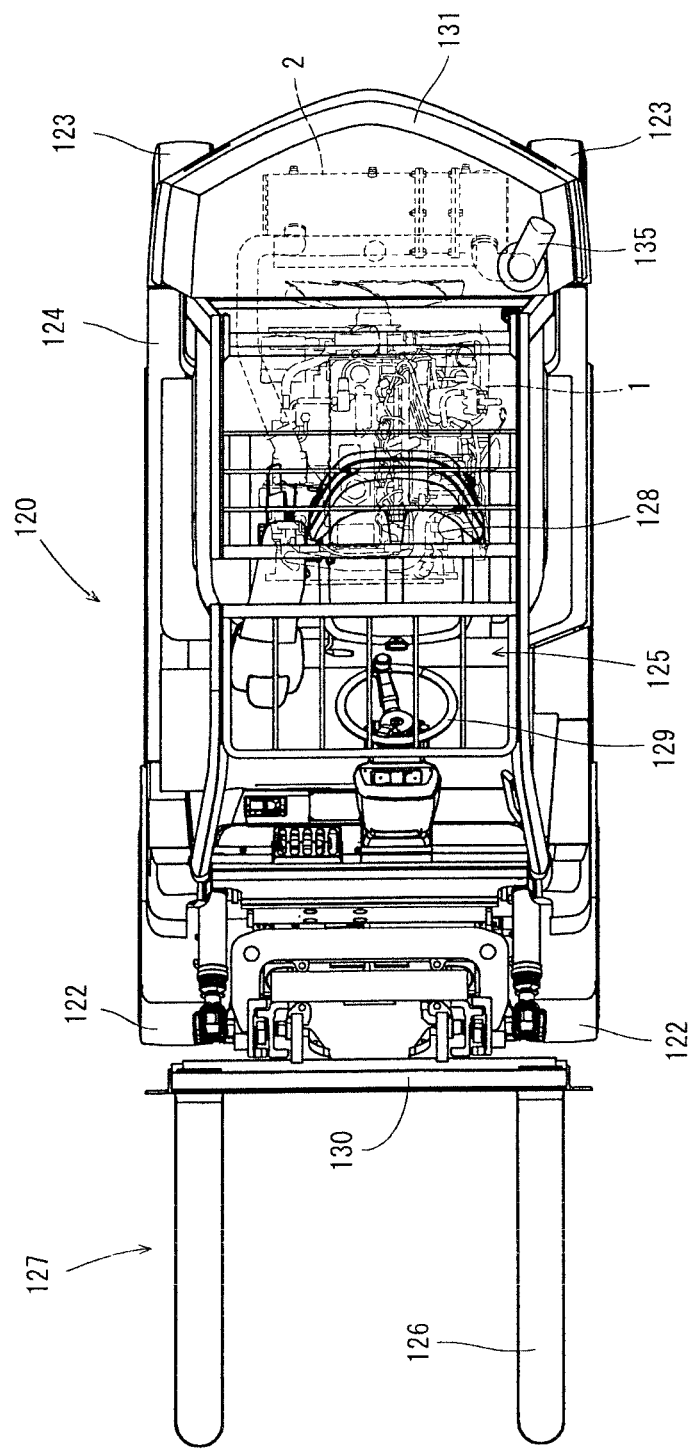
FIG. 19 is a plan view of the forklift car.

A structure of a forklift car 120 provided with a diesel engine 1 will be described with reference to FIGS. 18 and 19. As shown in FIGS. 18 and 19, the forklift car 120 includes a running body 124 having a pair of right and left front wheels 122 and a pair of right and left rear wheels 123. The running body 124 is provided with a steering portion 125 and the diesel engine 1. A front side of the running body 124 is provided with an operating portion 127 having a fork 126 for a loading and unloading operation. A driver's seat 128 on which an operator sits, a steering wheel 129, operating means for an output operation of the diesel engine 1 and the like, and a lever or a switch as operating means for the operating portion 127 are placed in the steering portion 125.

A mast 130 which is a constituent element of the operating portion 127 is placed such that the fork 126 can move up and down. By moving the fork 126 up and down, a palette (not shown) on which a load is placed is placed on the fork 126, and the running body 124 is moved forward or rearward, thereby executing the loading and unloading operation such as a transport operation of the palette.

In this forklift car 120, the diesel engine 1 is placed below the driver's seat 128, and the exhaust gas purification device 2 is placed behind the driver's seat 128. Therefore, the exhaust pipe 72 which connects the diesel engine 1 and the exhaust gas purification device 2 to each other extends rearward from a lower side of the driver's seat 128, and the exhaust gas purification device 2 is placed far from the diesel engine 1. The tail pipe 135 connected to the exhaust gas purification device 2 extends upward from the exhaust gas purification device 2 at a location behind the driver's seat 128. According to this, exhaust gas discharged from the exhaust gas purification device 2 passes through the tail pipe 135 and is discharged rearward and upward of the driver's seat 128.

The diesel engine 1 is placed such that the flywheel housing 10 is located on the side of a front portion of the running body 124. That is, the diesel engine 1 is placed such that a direction of an engine output shaft 74 extends along a longitudinal direction along which the operating portion 127 and a counter weight 131 are arranged side by side. A transmission case 132 is connected to a front surface of the flywheel housing 10. Power sent from the diesel engine 1 through the flywheel 10 is appropriately changed in speed at the transmission case 132, and the power is transmitted to the rear wheels 123, the fork 126 and a hydraulic driving source 133 of the front wheels 122.

Figure 20:
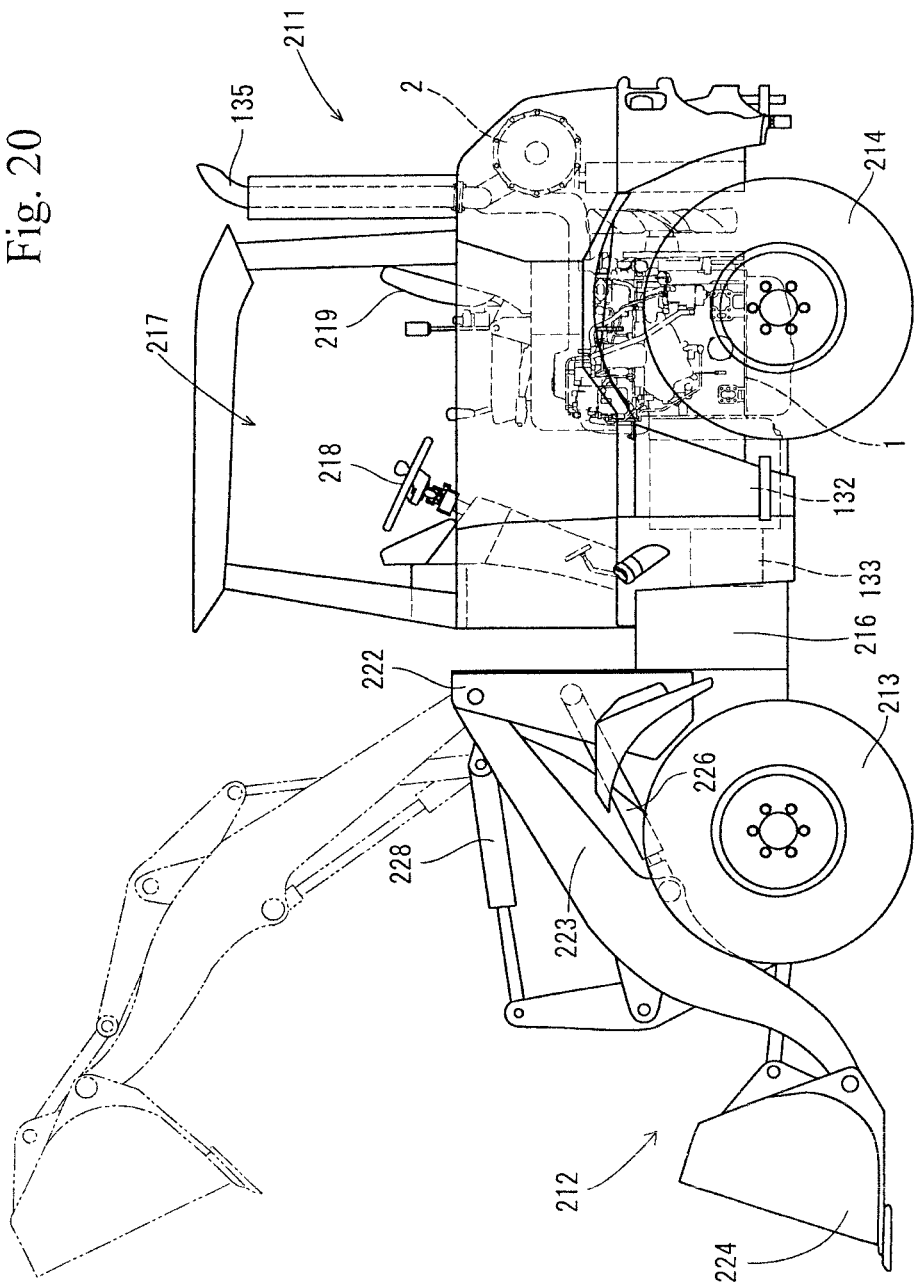
FIG. 20 is a side view of a skid-steer loader.
Figure 21:
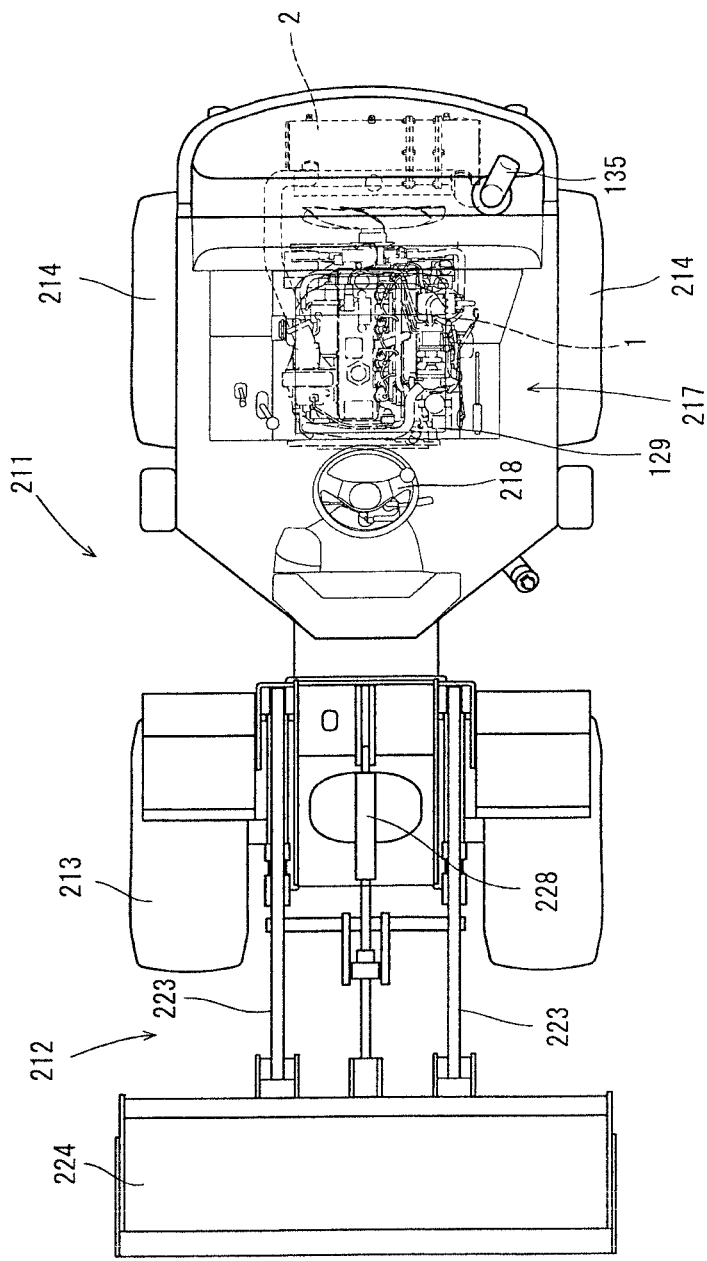
FIG. 21 is a plan view of the skid-steer loader.

Next, a structure of a forklift car 211 provided with the diesel engine 1 will be described with reference to FIGS. 20 and 21. Like the forklift car 120, a skid-steer loader 211 shown in FIGS. 20 and 21 includes a running body 216 having a pair of right and left front wheels 213 and a pair of right and left rear wheels 214. The running body 216 is provided with a steering portion 217 and the diesel engine 1. A front side of the running body 216 is provided with a loader device 212 which is an operating portion so that an operation as a loader can be carried out. A driver's seat 219 on which an operator sits, a steering wheel 218, operating means for an output operation of the diesel engine 1 and the like, and a lever or a switch as operating means for the loader device 212 are placed in the steering portion 217.

The loader device 212 which is the operating portion is provided on the front portion of the skid-steer loader 211 and above the front wheels 213 as described above. The loader device 212 includes loader posts 222 placed on both right and left sides of the running body 216, a pair of right and left lift arms 223 vertically swingably connected to upper ends of the loader posts 222, and a bucket 224 vertically swingably connected to tip ends of the right and left lift arms 223.

Lift cylinders 226 for vertically swinging the lift arms 223 are respectively provided between the loader posts 222 and the lift arms 223 corresponding to the loader posts 222. A bucket cylinder 228 for vertically swinging the bucket 224 is provided between the right and left lift arms 223 and the bucket 224. In this case, an operator on the driver's seat 219 operates a loader lever (not shown) and according to this, the lift cylinders 226 and the bucket cylinder 228 expand and shrink, the lift arms 223 and the bucket 224 vertically swing, and the operation as the loader is executed.

Like the forklift car 120, in this skid-steer loader 211 also, the diesel engine 1 is placed below the driver's seat 219, and the exhaust gas purification device 2 is placed behind the driver's seat 219. Therefore, the exhaust pipe 72 which connects the diesel engine 1 and the exhaust gas purification device 2 to each other extends rearward from a lower side of the driver's seat 219, and the exhaust gas purification device 2 is placed far from the diesel engine 1. The tail pipe 135 connected to the exhaust gas purification device 2 extends upward from the exhaust gas purification device 2 at a location behind the driver's seat 219. According to this, exhaust gas discharged from the exhaust gas purification device 2 passes through the tail pipe 135 and is discharged rearward and upward of the driver's seat 219.

The present invention of the application is not limited to the above-described embodiment, and the invention can be embodied in various modes. For example, the engine device of the invention of the application is not limited to the forklift car 120 and the skid-steer loader 211, and the invention can widely be applied to various utility vehicles such as an agricultural machine like a combine-harvester and a tractor, and a special utility vehicle such as a crane truck. Configurations of various portions in the invention of the application are not limited to those of the illustrated embodiment, and various modifications can be made without departing from the scope of the invention of the application.

REFERENCE SIGNS LIST

1 Diesel engine
7 Exhaust manifold
65 Exhaust throttle device
66 Relay pipe
68 Throttle valve case
70 Water-cool case
77 Throttle outlet pipe
78 Throttle inlet pipe
90 Heat shield member
91 Heat shield plate

The invention claimed is:

1. An engine device comprising an engine including an exhaust manifold, in which an exhaust throttle device adjusts exhaust gas pressure of the exhaust manifold,
wherein an exhaust gas intake side of a throttle valve case of the exhaust throttle device is fastened to an exhaust gas outlet of the exhaust manifold, and an exhaust gas pipe is connected to the exhaust manifold through the throttle valve case;
wherein a heat shield member for blocking heat from the exhaust manifold is provided between the exhaust manifold and the exhaust throttle device; and
wherein the heat shield member includes a heat shield plate provided between the exhaust manifold and the exhaust throttle device, and a plate material which stands from an end side of the heat shield plate closer to the engine and which is connected to an upper portion of the exhaust throttle device.

2. The engine device according to claim 1, further comprising a cooling water pump for circulating cooling water, and an EGR cooler for cooling EGR gas, wherein a cooling water pipe path connects the cooling water pump and the EGR cooler to each other, and an intermediate portion of the cooling water pipe path is provided with a cooling water pipe of the exhaust throttle device.

3. The engine device according to claim 1, wherein the throttle valve case is fastened to an upper surface of the exhaust manifold, a relay pipe is fastened to an upper surface of the throttle valve case, the throttle valve case and the relay pipe are placed in a multi-layered form with respect to the exhaust manifold, and the exhaust gas pipe is connected to the relay pipe of an uppermost layer.

4. The engine device according to claim 1, wherein an exhaust gas outlet of the exhaust manifold opens upwardly, the upper surface of the exhaust manifold is provided with the throttle valve case, a throttle valve gas outlet is formed in the upper surface of the throttle valve case, and an EGR cooler for cooling EGR gas is placed below the throttle valve case such that EGR cooler and the throttle valve case sandwich the exhaust manifold.

5. The engine device according to claim 1, wherein an intermediate portion of an engine cooling water pipe path is provided with a cooling water pipe of the exhaust throttle device.

6. An engine device comprising an engine including an exhaust manifold, in which an exhaust throttle device adjusts exhaust gas pressure of the exhaust manifold,
wherein an exhaust gas intake side of a throttle valve case of the exhaust throttle device is fastened to an exhaust gas outlet of the exhaust manifold, and an exhaust gas pipe is connected to the exhaust manifold through the throttle valve case;
wherein a heat shield member for blocking heat from the exhaust manifold is provided between the exhaust manifold and the exhaust throttle device; and
wherein the heat shield member includes a heat shield plate provided between the exhaust manifold and the exhaust throttle device, and two plate materials which stand from both end sides of the heat shield plate and which are connected to an upper portion of the exhaust throttle device, and the heat shield member is hanged from and supported by the exhaust throttle device.

7. The engine device according to claim 6, further comprising a cooling water pump for circulating cooling water, and an EGR cooler for cooling EGR gas, wherein a cooling water pipe path connects the cooling water pump and the EGR cooler to each other, and an intermediate portion of the cooling water pipe path is provided with a cooling water pipe of the exhaust throttle device.

8. The engine device according to claim 6, wherein the throttle valve case is fastened to an upper surface of the exhaust manifold, a relay pipe is fastened to an upper surface of the throttle valve case, the throttle valve case and the relay pipe are placed in a multi-layered form with respect to the exhaust manifold, and the exhaust gas pipe is connected to the relay pipe of an uppermost layer.

9. The engine device according to claim 6, wherein an exhaust gas outlet of the exhaust manifold opens upwardly, the upper surface of the exhaust manifold is provided with the throttle valve case, a throttle valve gas outlet is formed in the upper surface of the throttle valve case, and an EGR cooler for cooling EGR gas is placed below the throttle valve case such that EGR cooler and the throttle valve case sandwich the exhaust manifold.

10. The engine device according to claim 6, wherein an intermediate portion of an engine cooling water pipe path is provided with a cooling water pipe of the exhaust throttle device.

* * * * *